(12) United States Patent
Ismailov

(10) Patent No.: US 6,938,611 B2
(45) Date of Patent: **\*Sep. 6, 2005**

(54) FLOW METER

(75) Inventor: Murad M. Ismailov, Fernandina Beach, FL (US)

(73) Assignee: Combustion Dynamics Corp., New York, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 10/351,757

(22) Filed: Jan. 27, 2003

(65) Prior Publication Data

US 2003/0217737 A1 Nov. 27, 2003

Related U.S. Application Data

(60) Division of application No. 09/854,561, filed on May 15, 2001, now Pat. No. 6,510,842, which is a continuation-in-part of application No. 09/614,381, filed on Jul. 3, 2000, now abandoned.

(51) Int. Cl.$^7$ .............................. G01F 1/00; G01D 3/36; F02D 41/14

(52) U.S. Cl. ........................ 123/494; 73/119; 356/28.5

(58) Field of Search ................................. 123/478, 480, 123/494; 73/119 A, 861; 250/574; 356/28, 28.5

(56) References Cited

U.S. PATENT DOCUMENTS 3,933,135 A * 1/1976 Zillman et al. ............. 123/494

* cited by examiner

Primary Examiner—Tony M. Argenbright
(74) Attorney, Agent, or Firm—Greenberg Traurig, LLP

(57) ABSTRACT

The flow meter is a device having a laser Doppler anemometer (LDA) which measures the instantaneous center line velocity of fluid flow in a pipe and processes the instantaneous velocity so obtained to compute the volumetric flow rate, mass rate, and other flow characteristics as instantaneous quantities and/or integrated over a time interval using an electronic processing method which provides an exact solution to the Navier-Stokes equations for any periodically oscillating flow. The flow meter is particularly adapted for measuring the flow characteristics of high pressure automotive fuel injection systems. Three embodiments of the flow meter are described, including a stationary stand for off-line bench testing flow rate in a fuel injection system, a portable flow meter for inline testing in a vehicle's fuel line, and an on-board flow meter sensor connected to an engine control module.

23 Claims, 17 Drawing Sheets

FLOW METER

CROSS-REFERENCE TO RELATED APPLICATIONS

This is a divisional application of U.S. Ser. No. 09/854,561, filed May 15, 2001, now U.S. Pat. No. 6,510,842, which is a continuation-in-part of Ser. No. 09/614,381, filed Jul. 3, 2000, now abandoned.

BACKGROUND OF THE INVENTION

1. Field of the Invention

The present invention relates to flow meters for measuring the flow of fluid through a conduit. The flow meters described are particularly adapted for measuring the volumetric flow rate for a high pressure direct injection automotive fuel injection system. Also described is a software method of determining the volumetric flow rate for a periodic oscillating flow in a pipe from measurement of the instantaneous center line velocity.

2. Description of the Related Art

In automotive fuel injection systems, the power delivered by the engine is related to the shape of the spray, as well as the quantity and timing of fuel delivered to the combustion chamber. The design of fuel injectors and control of the operation of fuel injectors after installation would be greatly aided by a flow meter capable of providing data on the instantaneous volumetric flow rate in a fuel injection system, as well as a volumetric flow rate integrated over a specified time period, or a combination of the two. The present invention provides a flow meter which uses laser Doppler anemometry to measure the instantaneous center line velocity of fuel in a fuel pipe upstream from a fuel injector, and processes the data by Fourier transform using a novel exact solution to Navier-Stokes equations for any periodically oscillating flow to obtain the instantaneous volumetric flow rate of fuel in the system, as well as other desired flow characteristics.

Various devices for measuring fluid flow characteristics have been described previously. U.S. Pat. No. 3,548,655, issued Dec. 22, 1970 to M. J. Rudd, describes a laser Doppler velocimeter for measuring the velocity of fluid flow which measures the sinusoidal variation in light intensity as a particle in the fluid passes through interference fringes produced by laser beam which passes through a two slit mask. No means for measuring instantaneous velocity is described, nor is velocity necessarily measured on a center line. Further, no processing means for computing volumetric flow rate is described, and no means for indicating the direction of the velocity is described.

U.S. Pat. No. 3,825,346, issued Jul. 23, 1974 to J. Rizzo, reaches an interferometer for measuring fluid flow which uses two beams, a reference beam and a test beam, which travel equal path lengths and recombine to form an interference pattern. U.S. Pat. No. 3,937,087, issued Feb. 10, 1976 to W. S. Heggie, teaches a transducer for measuring pressure changes during fuel injection. The transducer is a resistive element in the form of a coil wrapped around the fuel line which varies in resistance as the fuel line expands and contracts, the difference in current through the coil being measured through a bridge.

U.S. Pat. No. 4,073,186, issued Feb. 14, 1978 to C. L. Erwin, Jr., describes a flow meter having a magnet mechanically attached to a valve, the magnet generating current in a magnetic pickup as the valve opens and closes for counting the flow pulses, the device releasing metered amounts of fuel with each pulse. The device appears to be for measuring fuel consumption, and not for regulating fuel flow into an injector. U.S. Pat. No. 4,192,179, issued Mar. 11, 1980 to E. Yelke, discloses a collar which fits around a fuel line to a fuel injector and has piezoelectric material affixed to the inside surface of the collar to develop an electrical signal as the fuel line expands and contracts.

U.S. Pat. No. 5,031,460, issued Jul. 16, 1991 to Kanenobu et al., teaches a device for detecting pressure changes in pipes. The device is a transducer with a bimorph piezoelectric transducer strapped around the pipe to sense expansion of the pipe as fluid is pulsed through the pipe. European Patent No. 489, 474, published Jun. 10, 1992, describes a laser apparatus for measuring the velocity of a fluid which uses an interferometer type device with a laser beam split into a reference beam and a measurement beam which is reflected back through the fluid so that the back scatter is compared to the reference beam to measure velocity. No method for processing the velocity to compute volumetric flow rate is described.

Japanese Patent No. 8-121,288, published May 14, 1996, shows a device for measuring injection rate with a pressure sensor for measuring the force of injection and a laser Doppler anemometer for measuring velocity, and which uses a mathematical formula which relates force and velocity to flow rate. Japanese Patent No. 8-121,289, published May 14, 1996, describes a device which uses two laser Doppler anemometers, one in the main supply line, the other in a bias flow generating unit fed by a divider pipe, to measure the flow rate by a differential flow rate method.

Applicant has co-authored several publications which disclose flow measuring devices. An article titled "Measurement of instantaneous flow rates in periodically operating injection systems" by F. Durst, M. Ismailov, and D. Trimis, published in *Experiments in Fluids*, Vol. 20, pp. 178–188 in 1996, describes a technique for measuring instantaneous flow rates using laser Doppler anemometry to measure center line velocity in a capillary pipe and an improved solution of the Navier-Stokes equations for any periodically oscillating flow to calculate instantaneous volumetric flow rate. The device measured the flow of water released by a magnetically operated valve through a 2 mm diameter tube.

A paper presented at the Flomeko '98 9th International Conference on Flow Measurement in June, 1998, titled "Accurate LDA Measurements of Instantaneous and Integrated Flow Rates in High Pressure Gasoline Injection System" by Ismailov et al., describes a device for measuring flow rate in a gasoline injection system at 7 MPa with a Unisia Jecs swirl injector. The device uses a 16 mW He—Ne laser directed through a beam splitter and frequency shifted by Bragg cells, focused by a lens to form a measurement control volume 485 μm in length and 46 μm in diameter on the center line of a quartz pipe 300 mm long having an inner diameter of 3.5 mm. The light is scattered by heptane and detected through a pinhole by a photomultiplier tube elevated at a 30°, the output being processed by a DOSTEK interface board. The center line velocities are processed according to the method set forth in Durst, supra.

A paper presented at the 3rd ASME/JSME Joint Fluids Engineering Conference Jul. 18–23, 1999 titled "Instantaneous Flow Rates in Gasoline Direct Injection System By Means of LDA and Bosch Meters" by Ismailov et al., and an article titled "LDA/PDA measurements of instantaneous characteristics in high pressure fuel injection and swirl spray" by Ismailov et al. in *Experiments in Fluids*, Vol. 27, pp. 1–11 (1999) present similar studies and describe similar measuring devices to those presented in the Flomeko article, supra.

None of the above inventions, patents, and publications, taken either singularly or in combination, is seen to describe the instant invention as claimed. Thus a flow meter solving the aforementioned problems is desired.

SUMMARY OF THE INVENTION

The flow meter is a device having a laser Doppler anemometer (LDA) which measures the instantaneous center line velocity of fluid flow in a pipe and processes the instantaneous velocity so obtained to compute the volumetric flow rate, mass rate, and other flow characteristics as instantaneous quantities and/or integrated over a time interval using an electronic processing method which provides an exact solution to the Navier-Stokes equations for any periodically oscillating flow. The flow meter is particularly adapted for measuring the flow characteristics of high pressure automotive fuel injection systems. Three embodiments of the flow meter are described, including a stationary stand for off-line bench testing flow rate in a fuel injection system, a portable flow meter for inline testing in a vehicle's fuel line, and an on-board flow meter sensor connected to an engine control module.

All three embodiments have an LDA which includes a laser light source which is split into two beams which are focused to intersect in a control measurement zone on the center line of a capillary pipe through which the fluid flows, and a photodetector to detect forward scatter. An interface board converts the Doppler frequency shift to instantaneous velocity measurements at a programmable sampling rate with nanosecond resolution. The velocity measurements provide data for a processor programmed to perform a discrete Fourier transform, to determine the coefficients of a Fourier expansion of the time resolved LDA measurements, and to use those coefficients to compute instantaneous pressure gradients, which are then used to compute instantaneous volumetric flow rates, mass flow rates, and other transient injection characteristics.

The stationary stand uses an He—Ne laser focused through a beam splitter to produce two coherent beams which are focused to intersect in the capillary pipe, which is mounted on an optical bench. The forward scatter is detected by a photomultiplier tube, which outputs the detected current to an interface board which may be mounted in a personal computer. Fluid flow is provided by a fuel system having a high pressure pump which is triggered to provide injection pulses to a swirl fuel injector at a predetermined or controllable frequency. The instantaneous and integral mass rates permit the testing, calibration, and setup of optimal characteristics of a fuel injection system and fuel injectors.

The portable flow meter uses a laser diode focused to reflect the beam through a prism and a holographic splitter which provides two beams focused to intersect in the control measurement zone of the capillary pipe. The capillary pipe is mounted in-line in a motor vehicle's fuel line. Forward scatter is focused on a PIN diode. The interface and electronic data processing system may be the same as that used in the stationary stand embodiment. The use of semiconductor components renders the portable flow meter compact and lightweight for transport, and adaptation of the capillary pipe for insertion into the vehicle's fuel line provides dynamic, in situ diagnostic test, calibration, and setup data for optimal adjustment of the vehicle's fuel injection system.

The on-board sensor has essentially the same optical components as the portable flow meter, except that the beam from the laser diode is not reflected through a prism, but focused directly through an optic wire normal to the capillary pipe. The capillary pipe is encased in a steel sheathe, so that the sensor may be permanently installed in the vehicle's fuel pipeline. The PIN diode detector is connected through an interface to the vehicle's engine control module, and the module's processor executes the data processing software, integrating the flow meter sensor's input with other sensor data to control and adjust injection system characteristics to provide fuel economy, power increase, and reduced exhaust emissions.

Accordingly, it is a principal object of the invention to provide a stationary stand flow meter for testing, calibration and setup of optimal fuel injection system characteristics for a high pressure fuel injection system, the flow meter indicating transient injection characteristics through instantaneous and integral mass rates.

It is another object of the invention to provide a portable, compact, lightweight flow meter capable of connection into a vehicle's fuel line which provides data on transient high pressure fuel injection system characteristics for testing, calibration and setup of optimal fuel injection system parameters.

It is a further object of the invention to provide an on-board fuel meter sensor connected to a gasoline or diesel engine control module for providing measurement, calculation, and control of transient fuel injection characteristics in order to improve fuel economy, increase engine power, and reduce harmful or noxious exhaust emissions.

Still another object of the invention is to provide an electronic data processing apparatus and method for computing instantaneous and integral volumetric and mass flow rates in a periodically oscillating fluid flow pipe from instantaneous center line velocity measurements.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a flow meter for measuring the instantaneous center line velocity in a pipe which uses an electronic data processing method to compute instantaneous and/or integral volumetric and mass flow rates, as well as other transient flow characteristics, from the velocity data by an exact solution of the Navier-Stokes equations for any periodically oscillating fluid flow in a pipe. The embodiments of the flow meter described herein are particularly adapted for measuring flow rates in a high pressure fuel injection system, although it will be obvious to those skilled in the art that the devices and principles described herein are easily modified for applications in industry, pharmacology and medicine.

Each embodiment of the flow meter includes a laser-Doppler anemometer (LDA) for measuring the center line instantaneous velocity of fluid flow through a capillary measurement pipe, and data processing software for computing flow rates from the measured velocity data.

Figure 1:
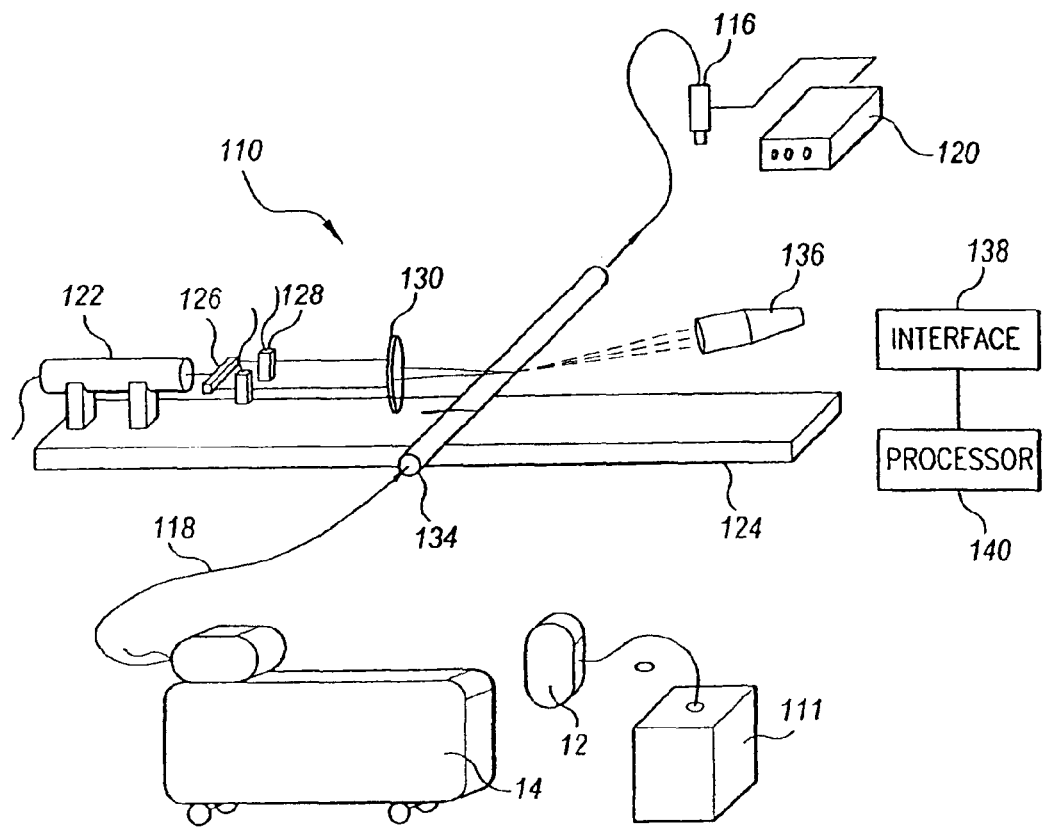
FIG. 1 is a diagrammatic view of a stationary stand flow meter according to the present invention.

FIG. 1 shows a stationary stand flow meter 110 for bench testing, calibration, and setup of the optimal characteristics of a diesel or gasoline electronic fuel injection system. For testing purposes, the fuel injection system includes a water-cooled fuel tank 111 with a capacity of ten to twenty liters, a low-pressure pump 112 with fuel filters, and a high pressure pump 114 for delivering the fuel at a maximum pressure of about 7 MPa for testing gasoline direct injection systems, or at a maximum of about 80.0 MPa for testing diesel engines. A fuel injector 116 is installed into the frame of a two-dimensional traversal stand and is directly connected to the high-pressure pump fuel line 118. A motor-synchronized time controller 120 provides a means for setting an injection frequency of 0.5 to 60 Hz and an injection duration of 0.25 to a few milliseconds with an encoding signal of 360 bin/cycle, which may be doubled or tripled at the user's option to increase the resolution.

Figure 2:
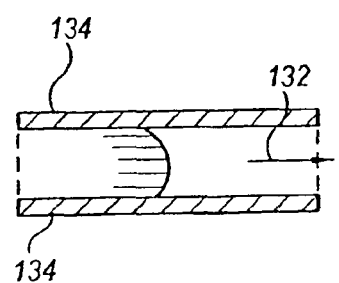
FIG. 2 is a diagram showing a center line velocity to be measured by an LDA component of a flow meter according to the present invention.

The LDA optical units include a laser source 122 mounted on an optical bench 124 which transmits a beam through a beam splitter 126 which divides the beam into two beams. A pair of Bragg cells 128, or acoustical-optical modulators, introduce a fixed frequency difference between the two beams so that the direction of the velocity may be determined. The two beams are focused by lens 130 so that they intersect in the plane of the velocity center line 132 (shown in FIG. 2) of the fluid flow through measurement pipe 134, defining a control measurement volume or zone which typically measures about 485 $\mu$m in length and 46 $\mu$m in diameter with a fringe space of 2.41 $\mu$m. The fuel does not need to be seeded. The high pressure (greater than 5 MPa for gasoline FIS and greater than 80 MPa for diesel FIS) causes cavitation to occur in the flow so that micrometer and submicrometer gaseous bubbles appear and Mi-scattering of the laser light occurs at the boundaries of the micro-bubbles. The scattered light is collected through a pinhole by an elevated photodetector 136 situated to receive forward scatter. The scattered light contains a Doppler shift, the Doppler frequency, which is proportional to the velocity component of the fluid perpendicular to the bisector of the two beams. The varying intensity of the light causes a varying current which is fed to an interface board 138 which converts the current to the velocity at the sampling rate selected by the user. The velocity data is fed to a processor 140, which computes instantaneous and/or integral volumetric flow rates, mass flow rates, pressure gradients, and other data for calibrating the performance of the fuel injector 116.

Figure 3:
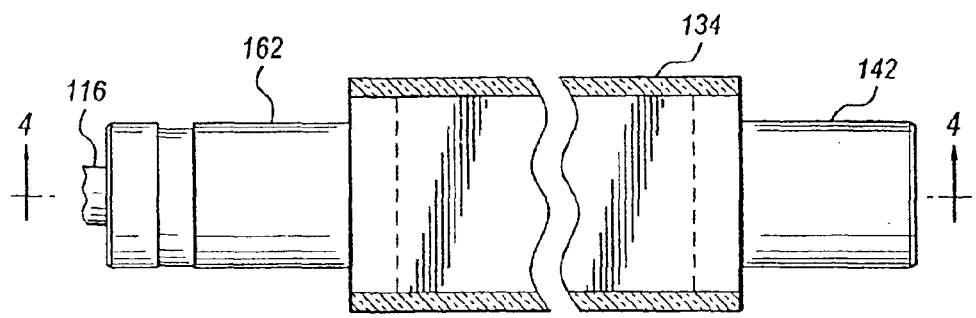
FIG. 3 is a plan view of a capillary measurement pipe according to the present invention for insertion into a pipeline.
Figure 4:
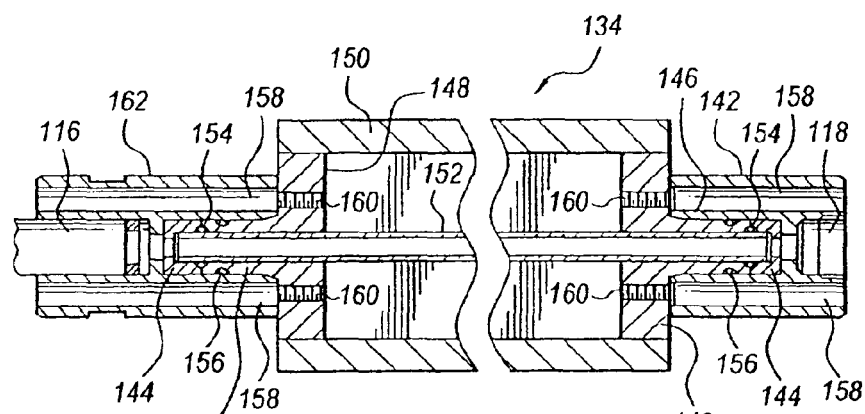
FIG. 4 is a section view along the lines 4—4 of FIG. 3.
Figure 5:
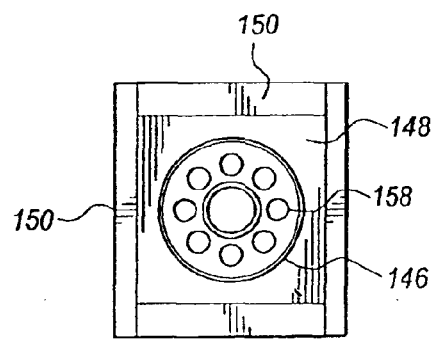
FIG. 5 is an end view of the capillary measurement pipe according to the present invention.

The measurement pipe 134 is described in more detail in FIGS. 3, 4 and 5. In FIGS. 3 and 4, fuel enters the measurement pipe 134 on the right and flows through the pipe 134 to the left. Referring to the right side of FIG. 4, the inlet unit 142 is made from stainless steel and is a cylindrical body which receives a cut end of the high pressure fuel pipeline 118 through which fuel is transported to the injector 116. Disposed within the inlet unit 142 is a stainless steel cylindrical fitting 144 which is axially aligned with a cylindrical nipple 146 integral with and extending from a rectangular, stainless steel plug 148. Plug 148 forms a seal at one end of a rectangular tube housing 150 made of Duron™ glass. A cylindrical quartz tube 152 is disposed within housing 150 and extends into the nipple 146 of plug 148. O-ring 154 forms a hermetic seal between quartz tube 152 and fitting 144 and nipple 146, while a second O-ring 156 forms a hermetic seal between nipple 146 and inlet unit 142, preventing fuel leakage. A plurality of screws extend through bores 158 in inlet unit 142 and are secured in threaded bores 160 in rectangular plug 148. Referring to the left side of FIG. 4, the outlet side of measurement pipe 134 is symmetrical and identical in construction to the right side, except that outlet unit 162 has a different internal geometry adapted for connection to injector 116.

Fuel flows from the fuel pipeline 118 through inlet fitting 144, quartz tube 152, outlet fitting 144 and into injector 116. Rectangular tube housing 150 is transparent, so that the beams from laser source 122 pass through the wall of housing 150 to intersect in the center line of quartz tube 152, the housing 150 serving to protect the operator in case of sudden breakage of quartz tube 152. Quartz tube 152 is cylindrical and preferably has a length between 200 and 350 mm, depending on injection pressure, and is between 3.0 and 3.5 mm in diameter. Scattered light passes out of quartz tube 152 and through the planar opposite wall of housing 150 to photodetector 136.

For a gasoline fuel injection system, operating at injection pressures between about 5.0 and 7.0 MPa, the laser source 122 may be a 16 mW He—Ne laser and the detector 136 may be a photomultiplier tube. The interface board 138 may be a Dostek model 1400A Laser Velocimeter Interface, made by Dostek, Inc. of Canada, or other conventional LDA interface board. The processor 140 may be a an IBM PC-compatible computer. For a gasoline FIS, the processor 140 may be programmed to resolve instantaneous and/or integral volumetric and mass flow rates for one-dimensional pipe flow, as described below with reference to FIGS. 16A and 16B.

Figure 6A:
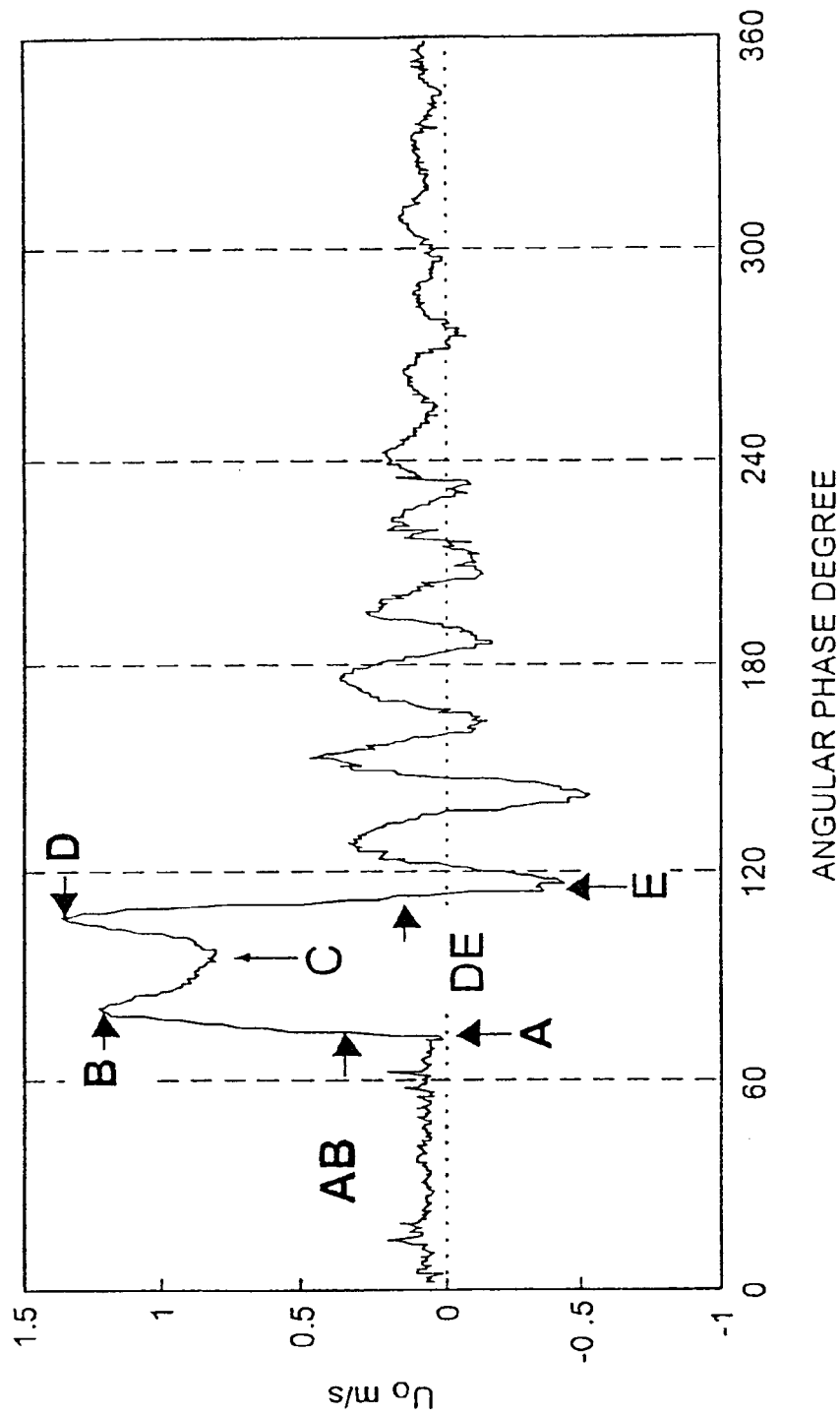
FIGS. 6A, 6B, and 6C are charts showing typical output from a flow meter according to the present invention in graphic form.
Figure 6B:
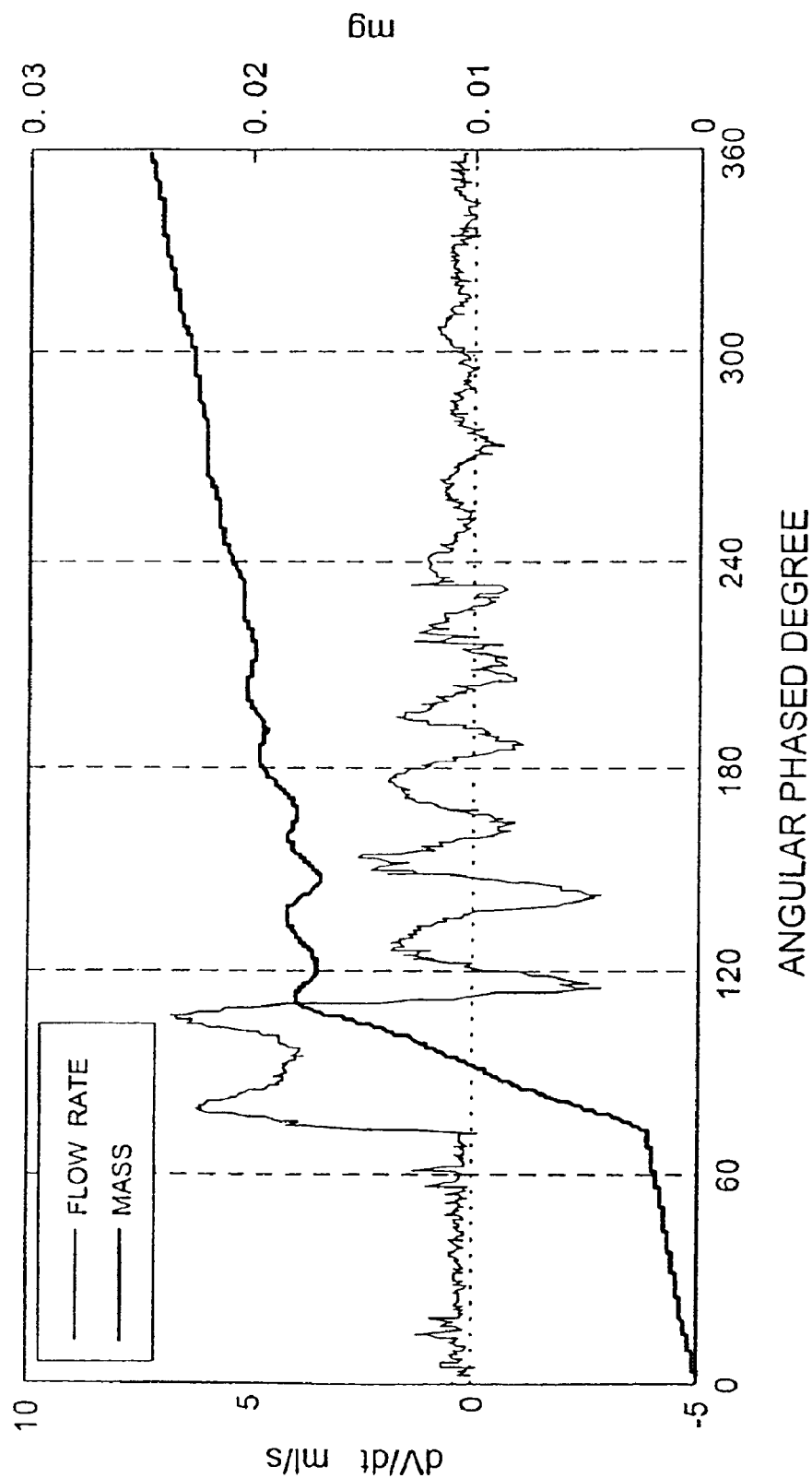
Figure 6C:
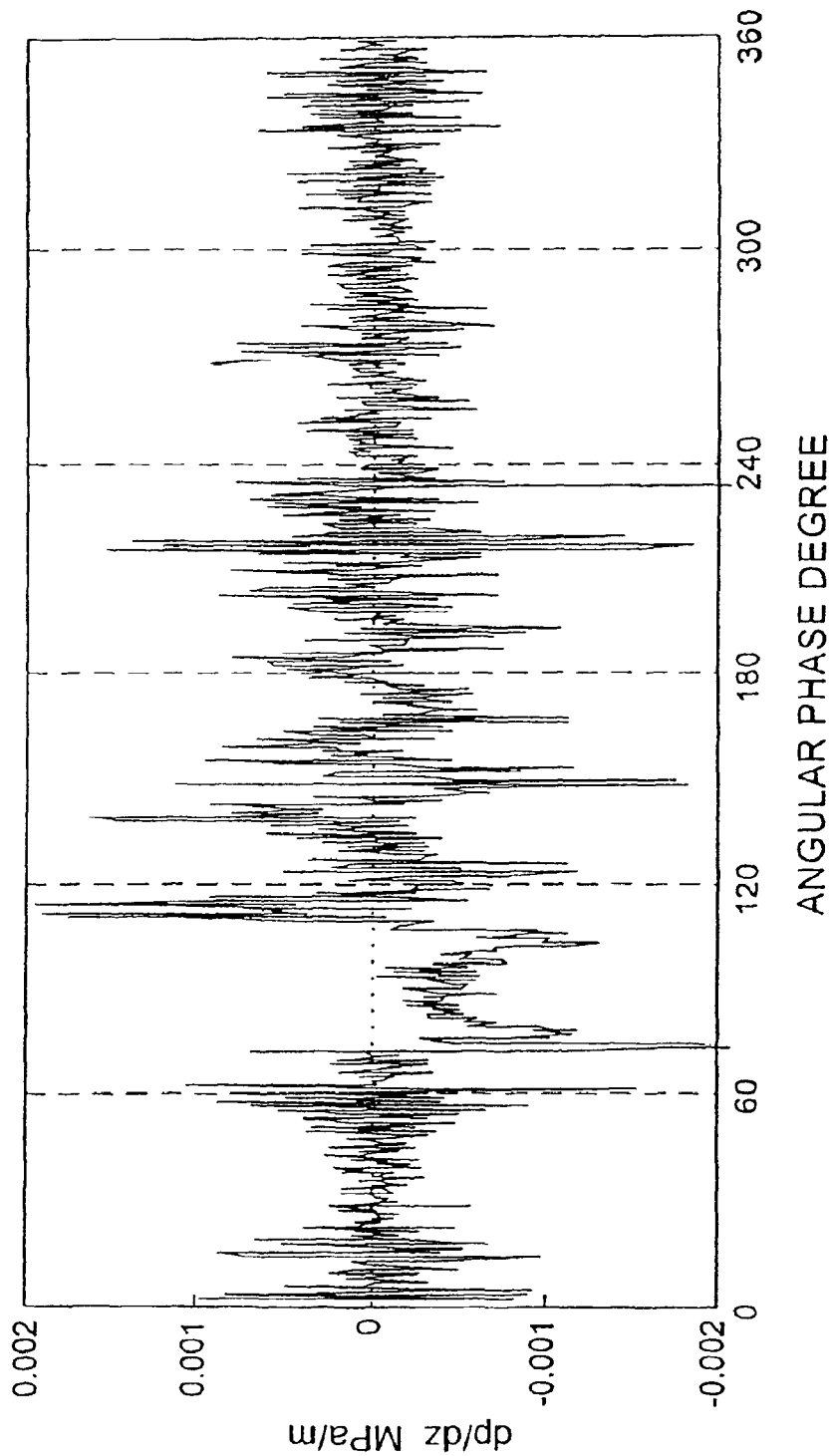

Typical output from the software is shown in graphical form in FIGS. 6A, 6B, and 6C. FIG. 6A shows the instantaneous center line velocity, $U_0$, versus the phase angle. In FIG. 6A, the letter A marks opening of the fuel injector valve and the letter D marks closure of the injector valve, with points B, C, and E marking transitions at various phase angles. FIG. 6B shows the calculated instantaneous volumetric flow rate, dV/dt, and integrated mass, $$m(t) = \int_0^\tau \frac{dV}{dt} \rho dt,$$

versus the phase angle. FIG. 6C shows the pressure gradient dp/dt versus the phase angle.

For a diesel fuel injection system, operating at injection pressures between about 80.0 and 100.0 MPa, the components of the stationary stand 110 need to be modified because of the very high injection pressure and higher fuel flow velocity in the fuel transport common rail (up to 32 m/s, instead of the 6 m/s in gasoline FIS), and the very fast transitions in the flow. First, the laser source 122 must have more power than the He—Ne laser due to the extremely decreased time of the scattering particles passing the LDA control measurement volume at the intersection of the beams. Therefore, for diesel FIS the laser source is preferably a diode pumped solid state laser with the emitting second harmonic wavelength of 532 nm (pumping by 808 nm) and power of 50 mW beam pre-collimated optics. Although the detector 136 may be a photomultiplier tube, an avalanche photodiode (at an elevation angle of 28° instead of 30°) is used as the detector 136, as it is more sensible in the range of 532 nm laser wave length, and it is more compact and flexible to install.

Furthermore, in a diesel FIS, the temporal resolution is very important for instantaneous flow rate measurements. In order to measure turbulent fluctuations, it is necessary to have the measurement time span $\Delta t = T/N_{meas}$, where $N_{meas} = $ 10,000 bins per injection stroke controlled by an electronic time generator or clock pulse. The main criterion to select clock watch resolution is:

$$\delta_n \sqrt{\frac{2v}{n\omega}} = \sqrt{\frac{v\Delta t}{\pi}} \leq \Lambda \quad (1)$$

where $\Lambda$, an optic fringe span in the laser beam intersection point, is dependent on laser wavelength $\lambda$ and a half intersection angle $\theta$ determined from $\Lambda = \lambda/(2 \sin \theta)$. In order to determine micron and submicron scattering particles, $\Lambda$-fringe was fixed to be 1.3 $\mu$m. For diesel injection flow, $\Delta t$ must be on the order of 1 $\mu$s, i.e., the time generator must provide a frequency higher than 1 MHz. Stable pulse generation is also required, with frequency fluctuation not lower than 0.1% from the base frequency. Therefore, for diesel FIS, the time controller 120 is not an external controller. Rather, the stationary stand 110 uses the quartz clock generator of the 32.768 series with a base frequency of 9.2333 MHz, installed in the Electronic Control Unit of existing diesel engines (this clock generator is used in the Detroit Diesel ECU). The second harmonic at 4.617 MHz is used. The measurement Fast Fourier Transform index is 10,000 (10,000 spans or output bins per injection stroke) because the typical injection period is varied from a few tens of milliseconds down to a few milliseconds.

Figure 15:
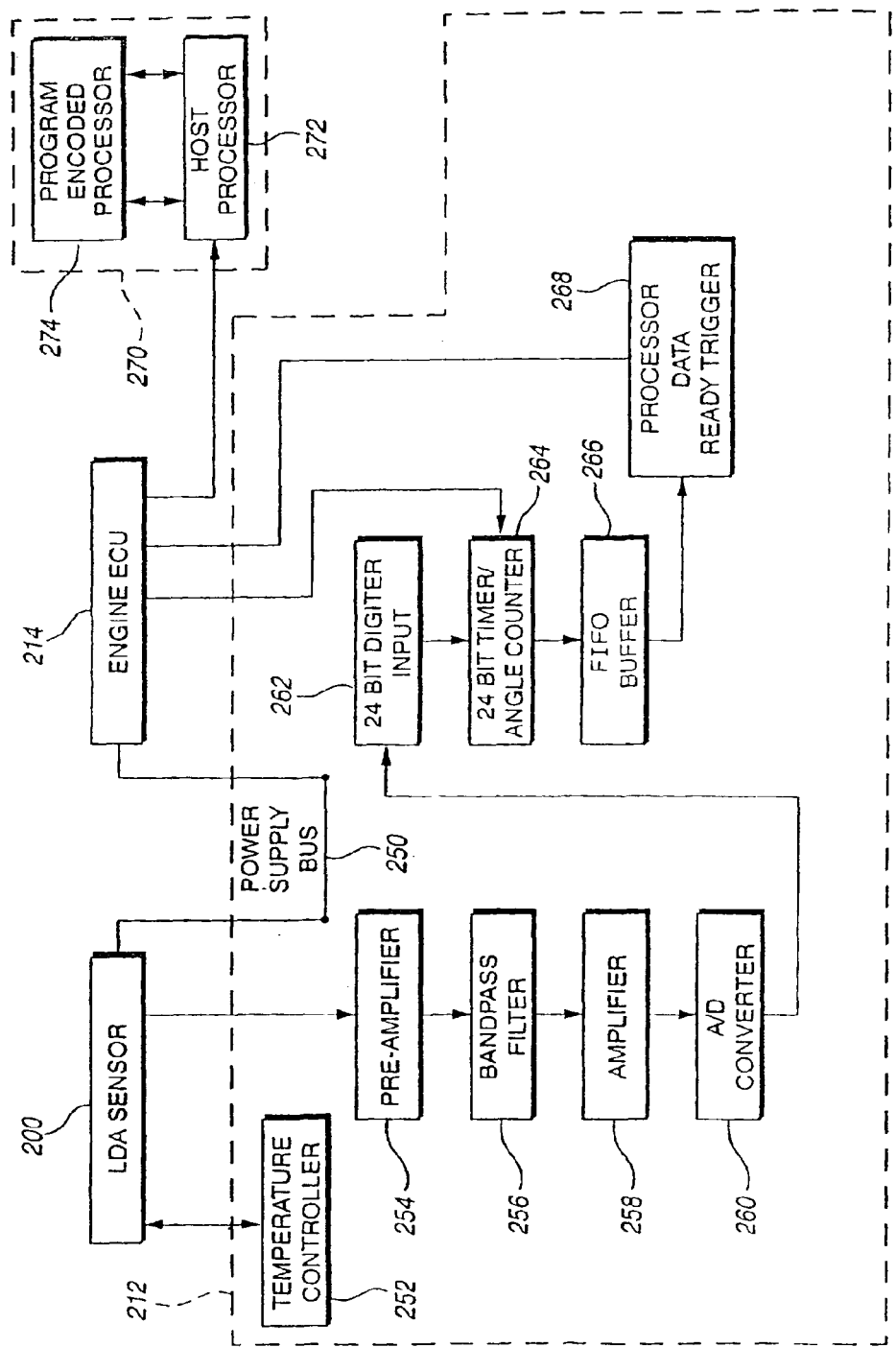
FIG. 15 is a block diagram of a custom interface board for use of the flow meter sensors with diesel FIS.

Again, in a diesel FIS, the Dostek interface, as well as other conventional LDA interface boards, provides unacceptable performance as an interface board 138, since the Dostek 1400A uses a time/crank angle reference only with a fixed injection period. For diesel systems, it is necessary to have an interface board which provides flexibility in changing the measurement time span at widely varied injection periods or engine speeds. Therefore, a customized interface card 138 described below with respect to FIG. 15 is used for diesel FIS. Finally, the software for resolution of instantaneous and/or integral volumetric and mass flow rates for one-dimensional pipe flow, as described below with reference to FIGS. 16A and 16B, proves to be inadequate for accurately resolving instantaneous rates at the higher pressures and velocities in a diesel system. Therefore, the processor 140 is programmed with improved software for resolution of instantaneous and/or integral volumetric and mass flow rates for three-dimensional turbulent pipe flow, as described with reference to FIGS. 17A and 17B.

Figure 7:
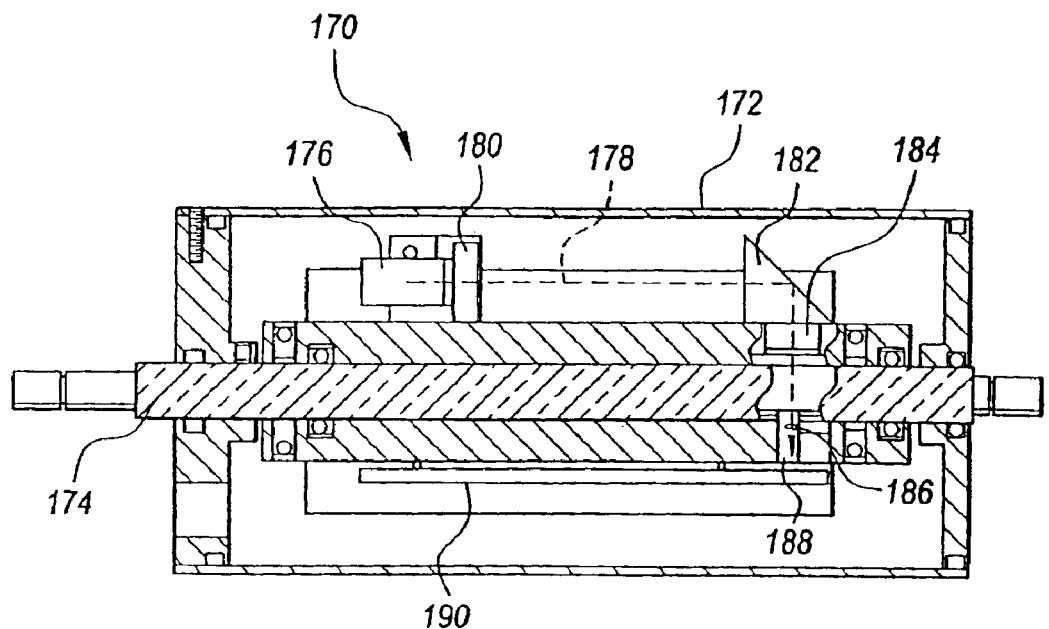
FIG. 7 is a diagrammatic section view of the optical system for a portable flow meter according to the present invention.
Figure 8:
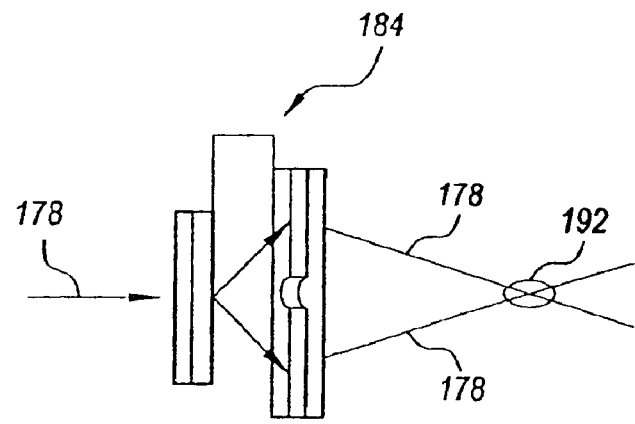
FIG. 8 is a detail view of a holographic beam splitter used in a flow meter according to the present invention.

FIG. 7 shows the optical components of a portable flow meter 170, which are integrated into a single compact box 172 measuring about 110×80×20 mm. A quartz measurement tube 174 having an internal diameter between about 3.0 to 3.5 mm is encased in a protective sheathe and passes axially through the center of the box 172. In use, the measurement tube 174 in inserted into the vehicle fuel pipeline between the fuel tank, or fuel pump, and the injector 116. Mounted within the box 172 is a laser diode 176 which emits a laser beam 178 through a collimating lens 180 to a prism 182, which redirects the beam 178 in a direction normal to the axis of the tube 174. The beam 178 passes through a holographic splitter 184, shown in FIG. 8, which splits the beam into two beams focused to intersect in a control measurement volume 192 in the center line of the tube 172. Light is scattered by micro-bubbles in the fuel, and focused by lens 186 through a pinhole mask on PIN diode 188, which is mounted on pre-amplifier board 190. The output from the pre-amplifier board 190 may then be routed to an interface board 138 and processor 140 as described above. Triggering of clock pulses may be accomplished through an external controller 120 for gasoline FIS, or through a custom controller for diesel FIS for the reasons described above.

Figure 9:
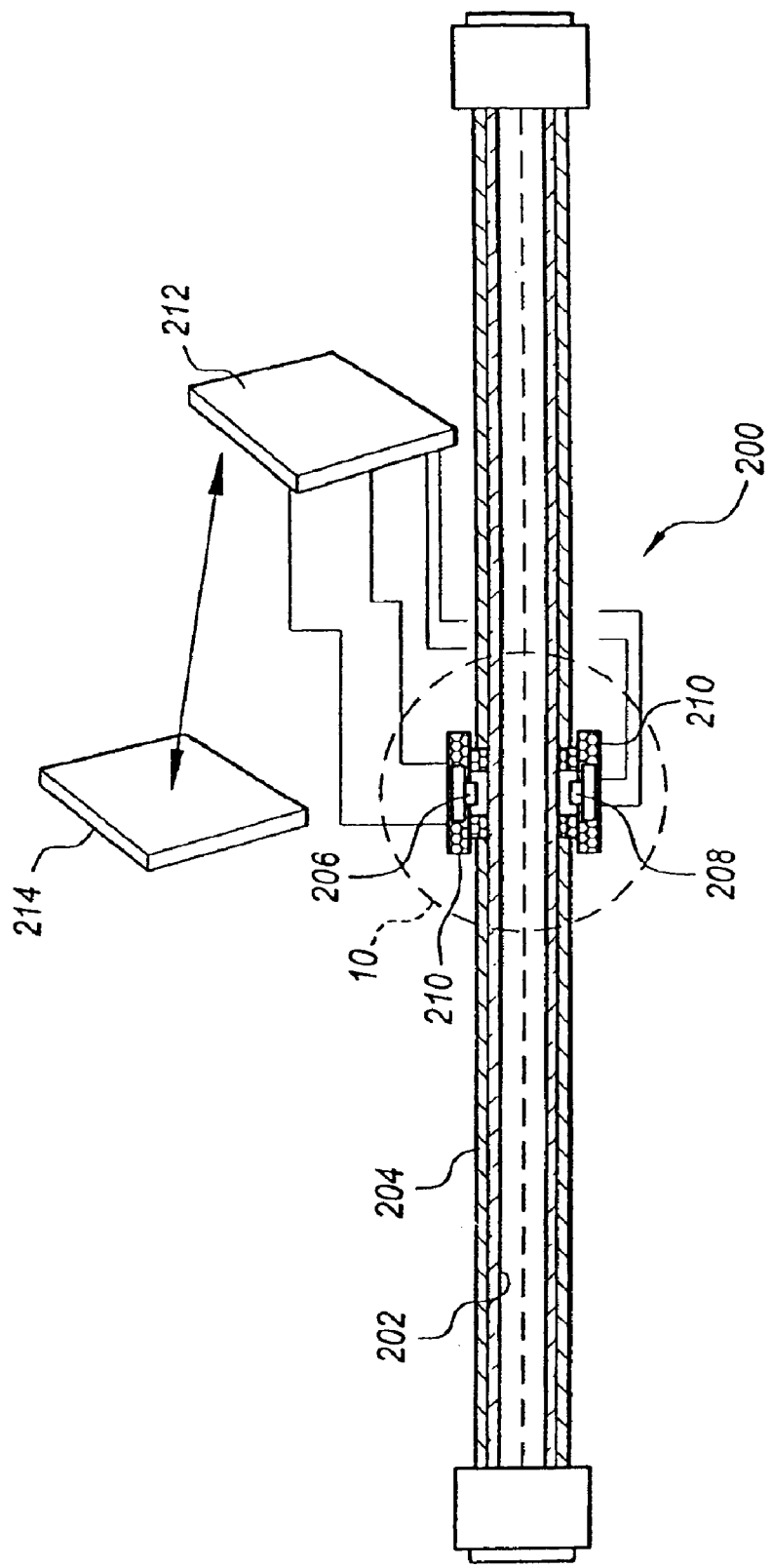
FIG. 9 is a diagrammatic view of an on-board flow meter sensor according to the present invention.

FIGS. 9 through 14 show an on-board fuel flow meter sensor 200 which may be installed as original equipment or as an after-market modification in a-motor vehicle. Referring to FIG. 9, the on-board flow meter 200 includes a cylindrical quartz measurement tube 202 about 300 to 350 mm in length and between 3.0 and 3.5 mm in diameter which is encased in a steel sheathe 204 and inserted in the fuel pipeline between the fuel tank, or fuel pump, and the fuel injector. The laser-Doppler anemometer (LDA) optical components include a laser diode 206 (832 nm, 18 mW) to emit the laser beam and a PIN diode detector 208 which are mounted in protective casings 210 in openings defined in the steel sheathe 204 on opposite sides of the measurement tube 202. The laser diode 206 and PIN diode 208 are electrically connected to interface board 212. The interface board 212 may be a separate component electrically connected to the Electronic Control Unit (ECO) 214, or may be made integral with the ECU 214. The ECU 214 includes a processor either integral with the ECU 214 or connected to the ECU 214 which is programmed to compute volumetric and/or mass flow rates and other data which the ECU 214 uses in connection with other sensor data input (load as determined by engine rpm, emissions data, etc.) to determine the optimal injection timing and pulse duration.

Figure 10:
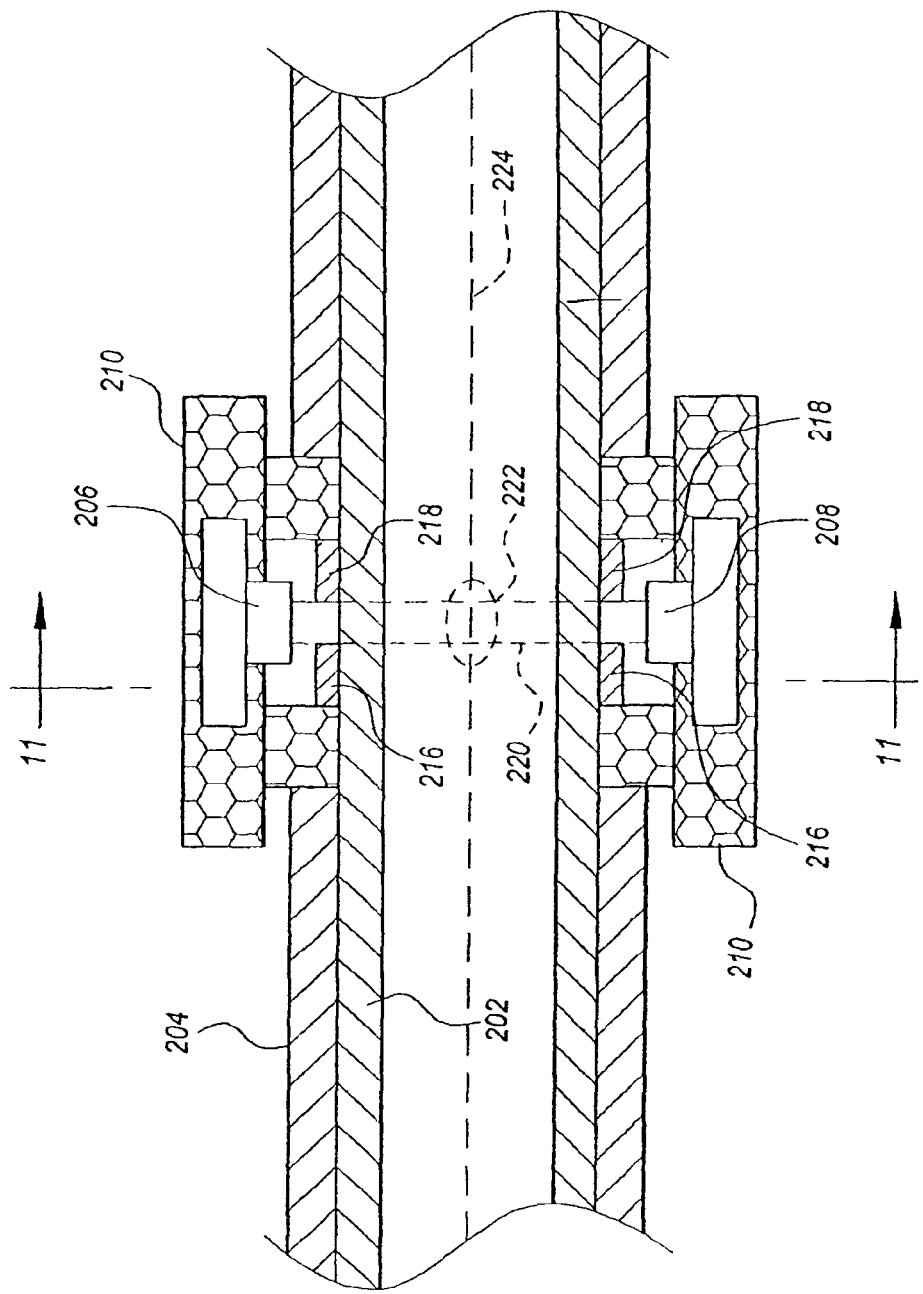
FIG. 10 is a detail view of the on-board flow meter sensor of FIG. 9.
Figure 11:
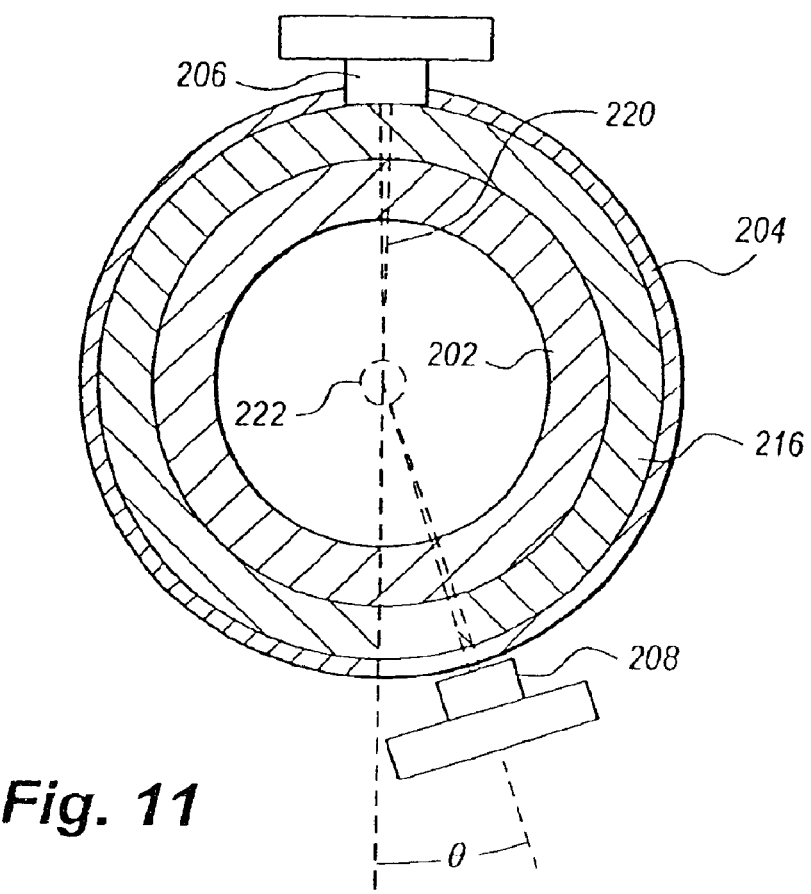
FIG. 11 is a section view along lines 11—11 of FIG. 10.

As shown in FIGS. 10 and 11, disposed in the opening defined in the steel sheathe 204 are two thin cylindrical rings 216 and 218, respectively, which encircle the quartz measurement tube 202 and are separated by a gap of between 150 and 180 µm in order to restrict emission of the laser beam(s) 220 to a narrow plane or laser sheet about 150 µm thick. The laser diode 206 is positioned to direct the beam(s) 220 normal to the longitudinal axis of the measurement tube 202 and across a diameter of the tube 202. The PIN diode 208 detector is not positioned exactly 180° opposite the laser diode 206, but is radially offset from the diameter by an angle θ of about 18° to detect scatter from the intersection of the split beam 220 in the control measurement zone 222 in the center line 224 of the measurement tube 202.

Figure 12:
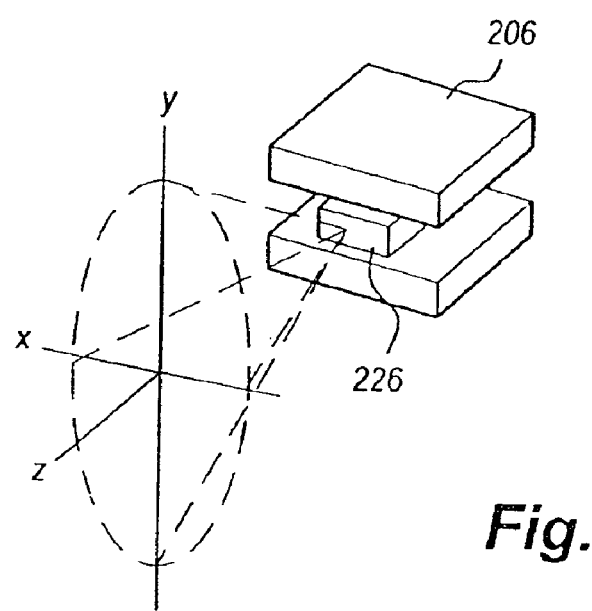
FIG. 12 is a diagrammatic perspective view of the elliptical cone shaped laser beam emitted by the laser diode.

As shown diagrammatically in FIG. 12, the laser diode 206 has an emitting semiconductor layer in a generally rectangular Fabry-Perot cavity which presents a crystal emitting stripe 226 of about 1.5 µm that emits a highly divergent beam in an elliptical cone which may be considered in an XYZ coordinate system, with the X direction indication lateral deflection, the Y direction indicating vertical deflection, and the Z direction indicating translational distance from the diode 206.

Figure 13:
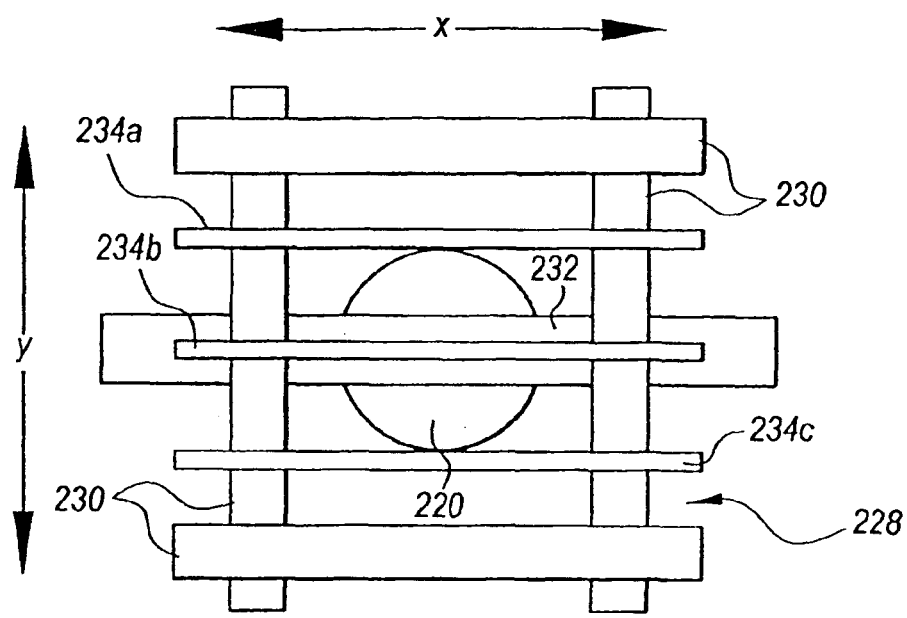
FIG. 13 is a view of a divergence mask used for the transmitting laser diode of FIG. 9.

In order to collimate and split the beam 220, a divergence mask 228, shown in FIG. 13, is used. The mask includes a rectangular X-Y traverse frame 230 on which an optic fiber or wire 232 having a diameter of about 10 µm is mounted. The frame 230 is mounted so that the optic fiber 232 is positioned about 1.6 to 1.7 times the diameter of the fiber from the diode and extends parallel to the crystal emitting stripe 226 normal to the beam 220. This geometry results in an excellent splitting of the beam in a number of "prism-like or pin-gap like" orders, symmetrically discharged in the Y plane, indicated by the Y arrows in FIG. 13, from which the minus and plus first order beams are selected for the LDA measurement. The geometry also results in beams 220 which are well collimated in the X plane, indicated by the X arrows in FIG. 13, which is important to conserve laser light energy. In order to make precise adjustments, the X-Y frame 230 is mounted on the emitting substrate 206 in such manner as to permit the optic fiber 232 to move linearly and rotate slightly in the X-Y plane. Also mounted on the frame 230 is a three-wire guitar 234a, 234b, and 234c with a highly back-reflecting surface to block direct propagation of the zero order and plus/minus second orders of the split beam 220. The divergence mask 228 focuses the split beam 220 to intersect in the control measurement zone 222 on the center line 224 of the measurement tube 202. Only light propagated in the Z plane reaches the detector 208 optics.

Figure 14:
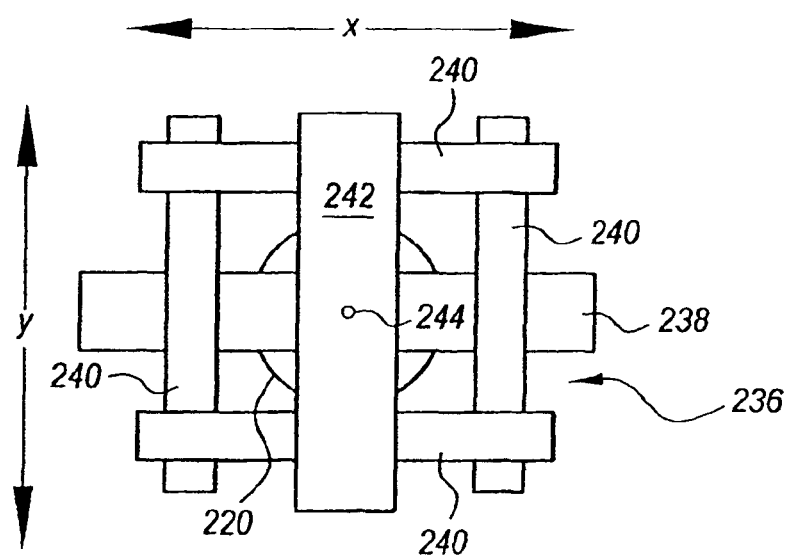
FIG. 14 is a view of a mask used for the PIN diode detector of FIG. 9.

A similar mask 236, shown in FIG. 14, is used in front of the PIN diode detector 208. The mask 236 also has an X-Y traverse frame 240 on which an optic fiber 238 of 18 µm diameter is mounted as described above. The frame 240 is mounted on the PIN diode substrate 208 so that the optic fiber 238 is positioned at a distance of about 2.1 times the diameter of the optic fiber 238 from the PIN diode 208 surface. Also mounted on the frame 240 between the PIN diode 208 and the optic fiber 238 is an aluminum plate 242 with a pinhole 244 about 50 µm in diameter defined therein to focus the scattered laser beam 220 on the PIN diode 208.

FIG. 15 shows a block diagram of an interface board 212 for use with the on-board flow meter sensor 200, and with the stationary stand 110 or portable flow meter 170 when the stationary stand 110 or portable flow meter 170 are used to test diesel FIS. The interface board 212 includes a power supply bus 250 which receives power from the ECU 214 for supplying power to the various circuits and components on the interface board 212, as well as power for the laser diode 206 and pin diode 208 in the on-board sensor 200. The interface board 212 includes various temperature controller circuitry 252 for receiving temperature sensor data from the laser diode 206 and PIN diode 208, and for controlling the temperature of the laser diode 206 and PIN diode 208 by controlling the current. The raw analog LDA sensor input is applied from the PIN diode 208 in succession to a pre-amplifier circuit 254, a bandpass filter 256 for screening out noise frequencies, an amplifier with adjustable gain 258, an analog to digital (A/D) converter 260, and a 24-bit parallel digital input circuit 262 to format the input for a 24-bit timer/angle counter 264 which receives clock and reset pulses from the ECU 214. The counter's 264 output is transferred to a first-in first-out (FIFO) buffer 266 and then to a processor data ready trigger 268 which serves as a register for transferring the velocity data U(t) to a processor 270 via the ECU 214. The individual circuits and components comprising the interface board 212 are conventional, and will not be described further.

The processor 270 may be a separate board, or it may be made integral with the ECU 214. The processor 270 includes a host instantaneous flow rate meter processor 272 which receives the velocity data U(t) as well as other input parameters (injection fluid temperature T(t) and pressure P(t), angular velocity (ω) and injection duration τ(t)) and calls the software program encoded on a custom integrated circuit processor 274 which calculates instantaneous volumetric flow rates, mass rates, and other sensor data which are input to the ECU 214 via the host processor 272 as data for calculating the optimal fuel injection timing and pulse duration.

Whether the instantaneous center line velocity, U(t) data, is measured with the stationary stand 110, the portable flow meter 170, or the on-board sensor 200, the velocity data is input to the processor 140 or 274 for processing by software which implements solutions to the Navier-Stokes equations to compute instantaneous volumetric flow rates, mass rates, etc. For a gasoline fuel injection system, the software may implement a solution for one-dimensional laminar flow for any periodically oscillating flow.

According to this method, the instantaneous volumetric flow rate V(t) is expressed as:

$$V(t) = \frac{\pi R^2}{2} \left( \frac{R^2 p_0}{4v} + \sum_{n=1}^{\infty} \left\{ \frac{p_n}{n\omega} i e^{in\omega t} \left[ \frac{4i^{1/2} J_1(i^{3/2} Ta_n)}{Ta_n J_0(i^{3/2} Ta_n)} - 2 \right] + C.C. \right\} \right) \quad (2)$$

where R is the radius of the measurement tube, v is the kinematic viscosity of the fluid, $p_0$ and $p_n$ are harmonic coefficients, ω is the angular frequency, t is the time, $i=\sqrt{-1}$, $Ta_n$ is the nth Taylor number $$Ta_n = R\sqrt{\frac{\omega n}{v}},$$

and C.C. is the complex conjugate. $J_0$ and $J_1$ are, of course, zero order and first order Bessel functions. The theoretical center line velocity is expressed as:

$$U(r \equiv 0, t) = \frac{R^2 p_0}{4v} + \sum_{n=1}^{\infty} \left\{ \frac{p_n}{n\omega} i e^{in\omega t} \left[ \frac{1}{J_0(i^{3/2} T a_n)} - 1 \right] + C.C. \right\} \quad (3)$$

On the other hand, the measured time series of center line velocities from the LDA measurements in $N_{exp}$ output bins within the period of an injection cycle can be transformed into the Fourier expansion:

$$U(r \equiv 0, t) = \frac{c_0}{2} + \sum_{n=1}^{N_{exp}} (c_n e^{in\omega t} + C.C.) \quad (4)$$

The harmonic coefficients $p_0$ and $p_n$ can be determined from equations (3) and (4) as follows:

$$p_0 = \frac{2c_0 v}{R^2} \text{ and } p_n = \frac{c_n i n\omega}{1 - \frac{1}{J_0(i^{3/2} T a_n)}} \quad (5)$$

The derivation of equations (2) through (5) is explained in Durst et al., supra, except that the equation for $p_n$ is incorrect in Durst (p. 180, equation 12) due to an algebraic error.

Figure 16A:
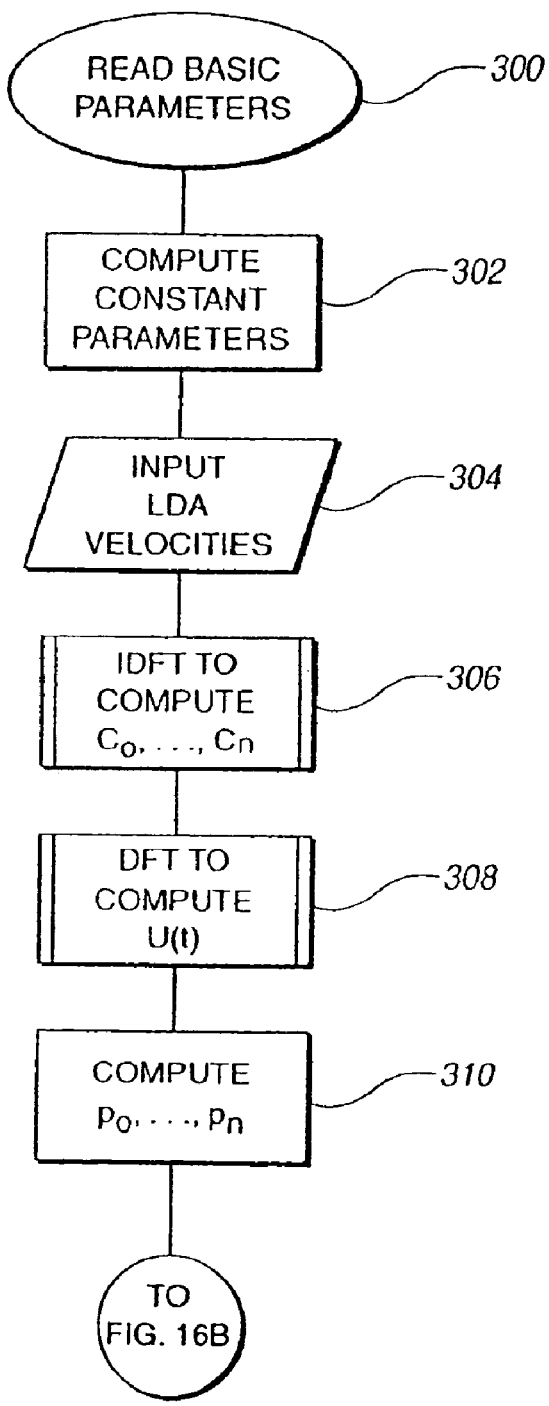
FIGS. 16A and 16B is a flow chart of a first electronic data processing method for transforming center line velocity data into volumetric and mass flow rates in a flow meter according to the present invention.
Figure 16B:
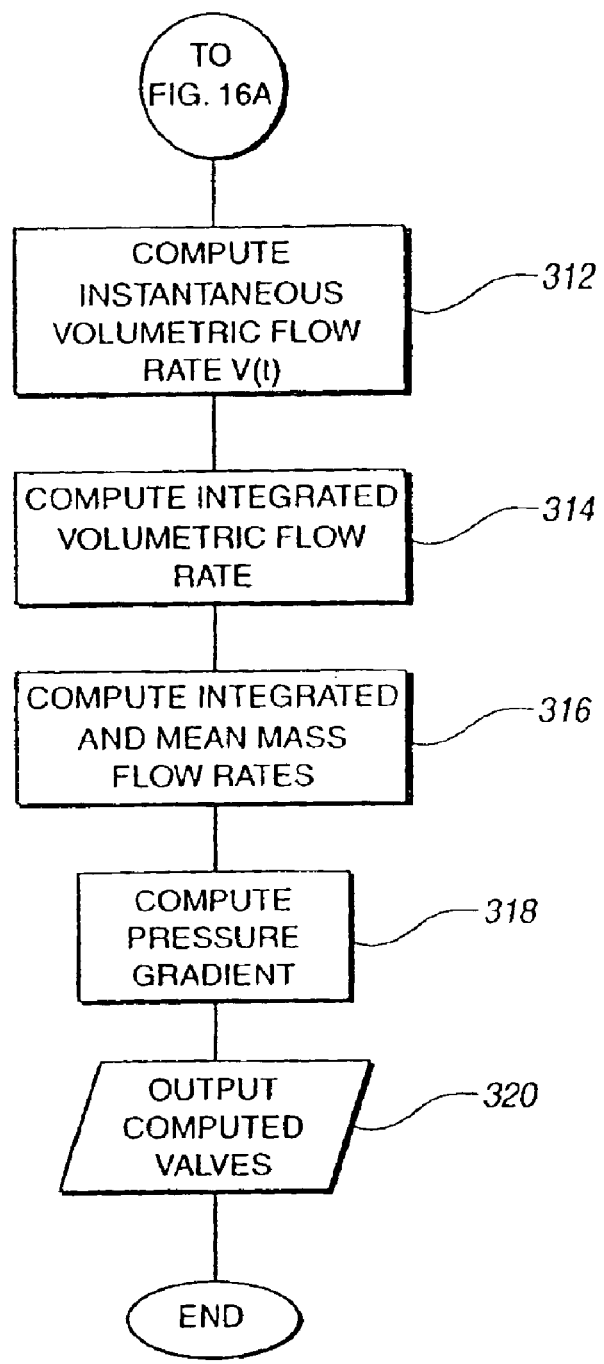

FIGS. 16A and 16B show an exemplary flow chart for a software program for implementing equations (2) through (5). When the processor 140 is a personal computer, the software may be written in any high level language, although Fortran is preferred due to its built in support for complex number arithmetic. When the processor is a custom integrated circuit, the software instructions may be encoded in ROM or an EPROM in assembly language, or in dedicated circuitry.

As shown in FIGS. 16A and 16B, certain basic parameters are read 300 or input to the processor, or hard coded into ROM, such as the injection period T0, kinematic viscosity $v$, fluid density $\rho$, radius of the pipe R, injection duration $\tau$, etc. In the next step 302, certain constant parameters can be computed, such as frequency f=1/T0 and angular frequency $\omega$=2$\pi$f, etc. In step 304, the LDA velocities are input to the processor 140 or 274 either directly or via the ECU 214. In step 306, the raw LDA velocities u(n) are used to compute the harmonic coefficients $c_0$ and $c_n$ by an inverse discrete Fourier transform (IDFT) of equation (4), i.e., $$c(m) = \frac{2}{N} \sum_{n=0}^{N-1} u(n) e^{im2\pi n/N} \quad (6)$$

where m=0, . . . , N/2 output bins and N is the number of LDA measurements per injection cycle. Only the first M=N/2 output bins are used due to symmetry and due to the fact that the input values are real. In equation (6) the factor 2/N is a scaling factor to correct the amplitude. In step 308, a forward discrete Fourier transform DFT:

$$U(n) = \frac{c_0}{2} + \sum_{m=1}^{M=N/2} c(m) e^{-im2\pi n/N} \quad (7)$$

where n=0, . . . , N is used to calculate the velocity series according to equation 4. In step 310, the values of $p_0$ and $p_n$ are determined using equation (5) and the values of $c_0$, . . . $c_n$ previously calculated in step 306. In step 312, the instantaneous volumetric flow rate V(t) is calculated using equation (2) and the values of $p_0$, . . . , $p_n$ previously calculated in step 310.

In step 314 the integrated volumetric flow rate is obtained by summing the instantaneous volumetric flow rates and dividing the sum by the number of samples N. In step 316 the integrated mass flow rate is obtained by multiplying the integrated volumetric flow rate by the density $\rho$, and the mean mass flow rate is obtained by multiplying the first term of the Fourier volumetric flow rate series V(t) by the density $\rho$. Optionally, at step 318, the instantaneous-pressure gradient series may be obtained by solving:

$$\frac{\partial P}{\partial z} = -\rho \left[ p_0 + \sum_{n=1}^{\infty} (p_n e^{in\omega t} + C.C.) \right] \quad (8)$$

which is the time series P_Z(ln) where $$P\_Z(\text{ln}) = -\rho \left[ p_0 + \sum_{j=1}^{N/2} p(j) e^{ij2\pi \ln/N} \right] \quad (9)$$

At step 320, the program outputs the computed values, either to a display device, or to the ECU 214.

The effectiveness of the solution for one-dimensional laminar flow for any periodically oscillating flow is limited by the Reynolds number $Re_\delta \leq 700$ where the Stokes layer thickness $\delta = \sqrt{2v/\omega}$ limits application of the method. The effect of this limitation is that the software solution described in FIGS. 16A and 16B is limited to gasoline direct injection engines, which have a lower injection pressure than diesel fuel injection systems.

In order to obtain accurate flow meter calculations of the volumetric flow rate in diesel fuel injection systems, a more exact solution of the Navier-Stokes equations for turbulent flow in a circular pipeline is required. The z-momentum and r-momentum Navier-Stokes equations are:

$$\frac{\partial(\rho\tilde{u})}{\partial t} + \frac{\partial}{\partial z}(\rho\tilde{u}\tilde{u}) + \frac{1}{r}\frac{\partial}{\partial r}(r\rho\tilde{v}\tilde{u}) = -\frac{\partial\tilde{p}}{\partial z} + \frac{\partial}{\partial z}\left(\mu\frac{\partial\tilde{u}}{\partial z}\right) + \frac{1}{r}\frac{\partial}{\partial r}\left(r\mu\frac{\partial\tilde{u}}{\partial r}\right) \quad (10)$$

$$\frac{\partial(\rho\tilde{v})}{\partial t} + \frac{\partial}{\partial z}(\rho\tilde{u}\tilde{v}) + \frac{1}{r}\frac{\partial}{\partial r}(r\rho\tilde{v}\tilde{v}) = -\frac{\partial\tilde{p}}{\partial z} + \frac{\partial}{\partial z}\left(\mu\frac{\partial\tilde{v}}{\partial z}\right) + \frac{1}{r}\frac{\partial}{\partial r}\left(r\mu\frac{\partial\tilde{u}}{\partial r}\right) - \mu\frac{\tilde{v}}{r^2} \quad (11)$$

respectively, where the tilde overscore denotes the sum of mean and fluctuation parts of the Reynolds decomposition, so that $\tilde{p}$=P+p', $\tilde{u}$=U+u', and $\tilde{v}$=V+v'. In high pressure fuel injection pipe flow, the radial partial derivatives are two or three orders of magnitude less than the axial partial derivatives. Therefore, equations (10) and (11) can be simplified to:

$$\frac{\partial(\rho\tilde{u})}{\partial t} + \frac{\partial}{\partial z}(\rho\tilde{u}\tilde{u}) = -\frac{\partial\tilde{p}}{\partial z} + \frac{\partial}{\partial z}\left(\mu\frac{\partial\tilde{u}}{\partial z}\right) + \frac{1}{r}\frac{\partial}{\partial r}\left(r\mu\frac{\partial\tilde{u}}{\partial r}\right) \quad (12)$$

$$\frac{\partial(\rho\tilde{v})}{\partial t} + \frac{\partial}{\partial z}(\rho\tilde{u}\tilde{v}) = -\frac{\partial\tilde{p}}{\partial r} \quad (13)$$

respectively.

The velocity components may be decomposed to the mean velocity $W=W_{st}+W_{osc}$, where $W_{st}$ is a stationary portion of velocity and $W_{osc}$ is an oscillating portion of velocity, and the fluctuating velocity w', so that:

$$\tilde{u}=U+u'=U_{st}+U_{osc}+u' \text{ and } \tilde{v}=V_{st}+V_{osc}+v' \quad (14)$$

With respect to the pressure, three parts (stationary, oscillating, and fluctuating) are also superposed, so that:

$$\frac{\partial P}{\partial z} = -\rho(P)\left(p_{oz} + \sum_{n=1}^{\infty}(p_{lz} + p'_{lz})e^{in\omega t} + C.C._{pz}\right) \quad (15)$$

where $p_{oz}$ is the stationary portion of pressure, $p_{lz}$ is the oscillating portion, and p' is the fluctuating portion. The fluid density is a linear compressible term, iterated at each i-step calculation:

$$\rho(P) = \rho(P_0) + \sum_{n=1}^{i}\frac{\partial \rho}{\partial P}dP \quad (16)$$

Using equations (14) and (15), the z-momentum and r-momentum equations (12) and (13) can be rewritten as a system of transport equations, so that the z-momentum is expressed by:

$$\frac{\partial(\rho U)}{\partial t} = \rho(P)\left(p_{oz} + \sum_{n=1}^{\infty}p_{lz}e^{in\omega t} + C.C._{pz}\right) + \frac{1}{r}\frac{\partial}{\partial r}\left(r\mu\frac{\partial U}{\partial r}\right) \quad (17)$$

$$\frac{\partial(\rho u')}{\partial t} + \frac{\partial}{\partial z}(\rho u^2) = \rho(P)\left(\sum_{n=1}^{\infty}p'_{lz}e^{in\omega t} + C.C._{pz}\right) + \frac{\partial}{\partial z}\left(\mu\frac{\partial u'}{\partial z}\right) + \frac{1}{r}\frac{\partial}{\partial r}\left(r\mu\frac{\partial u'}{\partial r}\right) \quad (18)$$

and the r-momentum is expressed by:

$$\frac{\partial(\rho V)}{\partial t} = \rho(P)\left(p_{or} + \sum_{n=1}^{\infty}p_{lr}e^{in\omega t} + C.C._{pr}\right) \quad (19)$$

$$\frac{\partial(\rho v')}{\partial t} + \frac{\partial}{\partial z}(\rho u'v') = \rho(P)\left(\sum_{n=1}^{\infty}p'_{lr}e^{in\omega t} + C.C._{pr}\right) \quad (20)$$

Equations (17) and (19) may then be integrated in conventional fashion. With respect to equations (18) and (20), the Reynolds scale in high-pressure injection oscillating capillary flow is the Stokes layer thickness $$\delta = \sqrt{\frac{2\nu}{\omega}}.$$

The measurement time span $\Delta t$ is on the order of $\sim 10^{-6}$ s and diesel fuel has a viscosity of about 2 to $4.5\times 10^{-6}$ m$^2$/s. With respect to such high temporal resolution, the critical space $$\delta = \sqrt{\frac{\nu \Delta t}{\pi}}$$

for detection of the flow fluctuation becomes an order of magnitude of $10^{-6}$ m, which is comparable with the optic interference fringe span $\Lambda$. Within such a very short time interval, the fluctuation of the velocity may be considered "frozen", as well as the liquid density. With these simplifications and manipulation with transfer functions, equations (18) and (20) may be further simplified and combined with the integration of equations (17) and (19) to produce the full solution for the velocity components, with the z-momentum expressed as:

$$\tilde{u} = \frac{R^2 p_{oz}}{4\nu}\left(1 - \frac{r^2}{R^2}\right) + \quad (21)$$

$$\sum_{n=1}^{\infty}\left(\frac{p_{nz} - \frac{p'_{nz}}{2}}{n\omega}ie^{in\omega t}\left(\frac{J_0\left(i^{3/2}Ta_n\frac{r}{R}\right)}{J_0(i^{3/2}Ta_n)} - 1\right) + C.C._U\right)$$

and the r-momentum expressed as:

$$\tilde{v} = \frac{R^2 p_{or}}{4\nu}\left(1 - \frac{r^2}{R^2}\right) + \quad (22)$$

$$\sum_{n=1}^{\infty}\left(\frac{p_{nr} - \frac{p_{nr}}{2}}{n\omega}ie^{in\omega t}\left(\frac{J_0\left(i^{3/2}Ta_n\frac{r}{R}\right)}{J_0(i^{3/2}Ta_n)} - 1\right) + C.C._U\right)$$

In order to obtain the instantaneous volumetric flow rate over a pipe cross section in the direction of the pipe axis, it is necessary to integrate the $\tilde{u}$ velocity component and turbulent velocity correlation $\sqrt{\overline{u'v'}}$ projected on the same pipe axis as follows:

$$\dot{V}(t) = 2\pi \int_0^R \left(\tilde{u} + \sqrt{\overline{u'v'}}\right)r dr = \quad (23)$$

$$\frac{\pi R^2}{2}\left[\frac{p_0 R^2}{4\nu} + \sum_{n=1}^{\infty}\left(\frac{p_{nz} - \left(\frac{p'_{nz}}{2} + \frac{\sqrt{p'_{nz}p'_{nr}}}{2}\right)}{n\omega}\right.\right.$$

$$\left.\left. ie^{in\omega t}\left\{\frac{4i^{1/2}J_1(i^{3/2}Ta_n)}{Ta_n J_0(i^{3/2}Ta_n)} - 2\right\} + C.C.\right)\right]$$

This flow rate reflects an effective axial velocity composing four terms, i.e., a stationary part associated with $p_{oz}$, an oscillatory part associated with $p_{nz}$, a u-pulsation part associated with $p'_{nz}$, and a uv-pulsation part associated with $p_{nz}p_{nr}$:

$$\tilde{u}_{ef} = \left[\frac{R^2 p_{oz}}{4\nu}\left(1 - \frac{r^2}{R^2}\right) + \right. \quad (24)$$

$$\left.\sum_{n=1}^{\infty}\left(\frac{p_{nz} - \left(\frac{p'_{nz}}{2} + \frac{\sqrt{p'_{nz}p'_{nr}}}{2}\right)}{n\omega}ie^{in\omega t}\left\{\frac{J_0\left(i^{3/2}Ta_n\frac{r}{R}\right)}{J_0(i^{3/2}Ta_n)}\right\}\right)\right.$$

When this velocity is measured on the centerline, r=0, equation 24 reduces to:

$$\tilde{u}_{ef} = \frac{R^2 p_{oz}}{4\nu} + \quad (25)$$

-continued $$\sum_{n=1}^{\infty}\left(\frac{p_{nz} - \left(\frac{p'_{nz}}{2} + \frac{\sqrt{p'_{nz}p'_{nr}}}{2}\right)}{n\omega} i e^{in\omega t}\left\{\frac{1}{J_0(i^{3/2}Ta_n)} - 1\right\}\right)$$

The experimentally measured center line velocity time series may be expressed as the Fourier expansion:

$$U_{LDA}(t) = U_{st} + U_{osc}(t) + U_{puls}(t) \qquad (26)$$

$$= \frac{c_0}{2} + \sum_{n=1}^{N_\delta} c_n(e^{in\omega t}) + c'_n(e^{in\omega t})$$

where switching in the Fourier expansion is dependent on the following criteria:

$$n \in [1, N_\delta] \quad \text{if} \quad \delta_n \sqrt{\frac{2v}{n\omega}} > 10\Lambda \qquad (27)$$

$$n \in [N_\delta + 1, N_{meas}] \quad \text{if} \quad \delta_n \sqrt{\frac{2v}{n\omega}} \leq 10\Lambda$$

Comparing equations (23) and (24) gives final expression for the pressure gradient series, which are needed to compute the instantaneous volumetric flow rate as expressed by equation (23):

$$p_{oz} = 2\frac{c_0 v}{R^2} \qquad (28)$$

$$p_{nz} = \frac{c_n n\omega i}{\left[1 - \frac{1}{J_0(i^{3/2}Ta_n)}\right]}, n \in [1, N_\delta]$$

$$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{meas}]$$

Figure 17A:
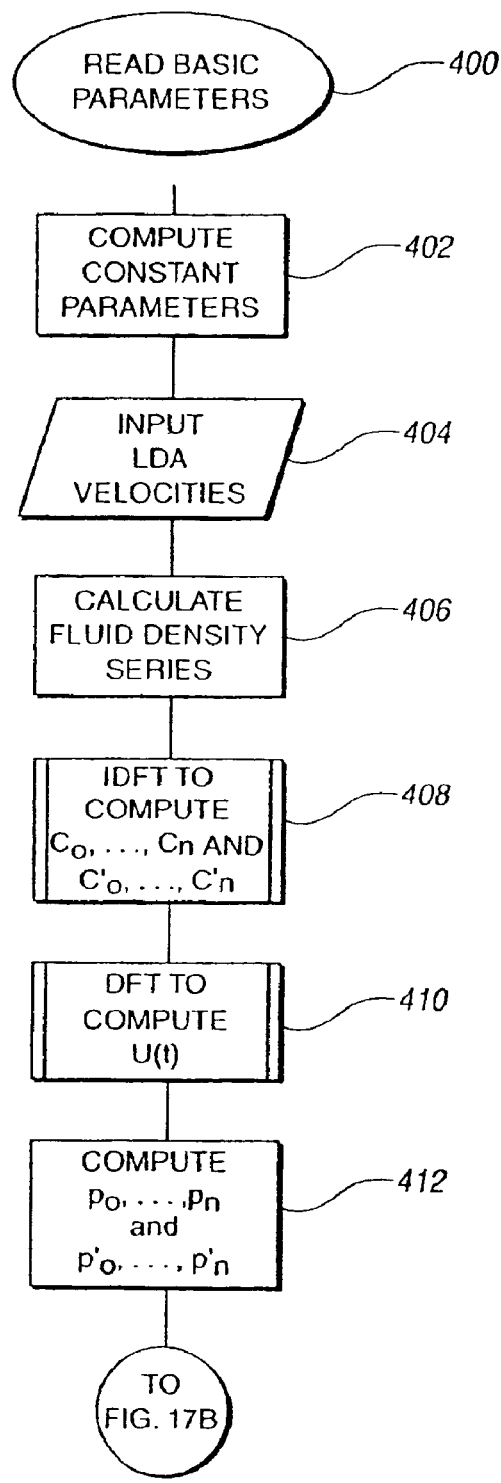
FIGS. 17A and 17B is a flow chart of a first electronic data processing method for transforming center line velocity data into volumetric and mass flow rates in a flow meter according to the present invention.
Figure 17B:
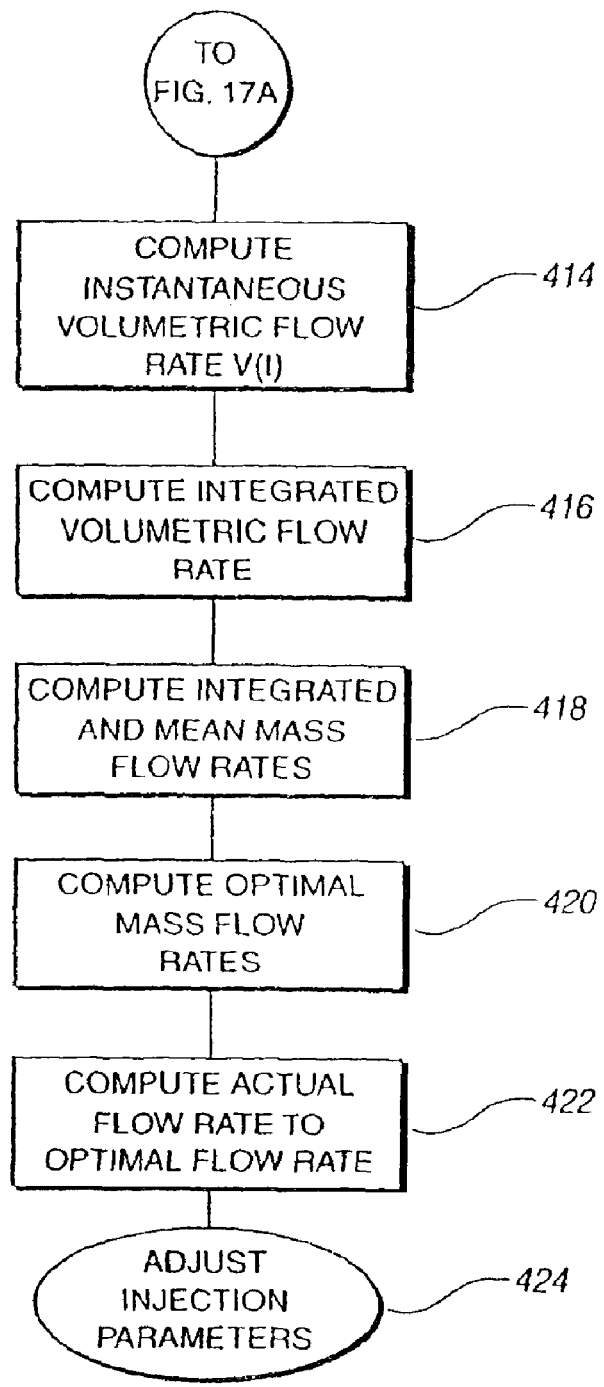

FIGS. 17A and 17B show an exemplary flow chart for a software program for implementing equations (10) through (28). When the processor 140 is a personal computer, the software may be written in any high level language, although Fortran is preferred due to its built in support for complex number arithmetic. When the processor is a custom integrated circuit, the software instructions may be encoded in ROM or an EPROM in assembly language, or in dedicated circuitry.

As shown in FIGS. 17A and 17B, certain basic parameters are read 400 or input to the processor, or hard coded into ROM, such as the injection period T0, kinematic viscosity ν tables where viscosity is a function of temperature, fluid density ρ tables where density is a function of pressure, radius of the pipe R, injection duration τ, etc. In the next step 402, certain constant parameters can be computed, such as frequency f=1/T0 and angular frequency ω=2πf, Stokes layer thickness δ, etc. In step 404, the LDA velocities are input to the processor 140 or 274 either directly or via the ECU 214. For diesel or high pressure fuel injection systems, the number of velocities measured per cycle, $N_{meas}$, is preferably 10,000. In step 406, the fluid density series is calculated using equation (16). In step 408, the raw LDA velocities u(n) are used to compute the harmonic coefficients $c_0, \ldots, c_n$, and $c_0', \ldots, c_n'$ by an inverse discrete Fourier transform (IDFT) of equation (26) analogous to that shown in equation (6), supra, the only difference being that each crank angle n is tested according to equations (27) to determine whether $c_n$ or $c_n'$ is incremented. In step 410, a forward discrete Fourier transform DFT, analogous to equation (7), is used to calculate the velocity series according to equation (25). In step 412, the values of $p_0$, $p_n$, and $p_n'$ are determined using equation (28) and the values of $c_0, \ldots c_n$ and $c_0', \ldots, c_n'$ calculated in step 408. In step 414, the instantaneous volumetric flow rate V(t) is calculated using equation (23) and the values of $p_0, \ldots, p_n$ and $p_0', \ldots, p_n'$ calculated in step 412.

In step 416 the integrated volumetric flow rate is obtained by summing the instantaneous volumetric flow rates and dividing the sum by the number of samples N. During calculation of the integrated volumetric flow rate, the injected fuel mass in the present cycle, $m_j$, can be obtained from:

$$m_j = \int_0^t \dot{V}(t) = \frac{T}{N_{meas} - 1} \sum_{n=1}^{n_j} \rho_n \dot{V}_n n \qquad (29)$$

In step 418 the integrated mass flow rate is obtained by multiplying the integrated volumetric flow rate by the density ρ, and the mean mass flow rate is obtained by multiplying the first term of the Fourier volumetric flow rate series V(t) by the density ρ. Optionally, at step 420, the optimal fuel injection rate may be computed given other sensor input provided to the ECU 214 regarding the load, emissions, etc. At step 422 the optimal flow rate is compared to the actual mass flow rate computed in step 416, for example, by $$\delta = \frac{m_j + m_{j-1}}{2m_{op}} \qquad (30)$$

In step 424 the ECU 214 may adjust such injection parameters as injection pulse duration, period between injection pulses, injector pressure, etc. in order to bring the actual flow rate into agreement with the optimal flow rate.

Figure 18A:
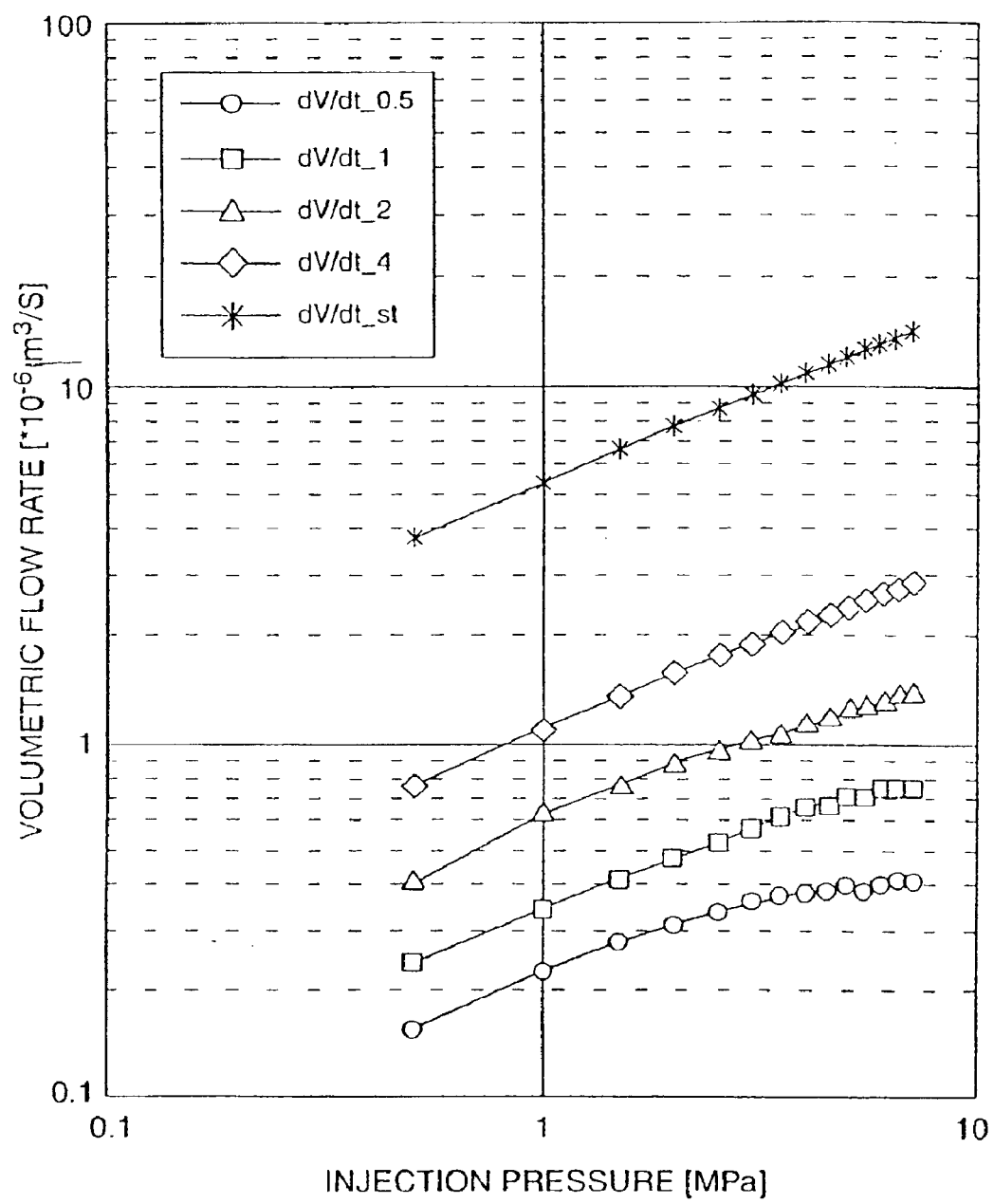
FIGS. 18A and 18B are charts showing a comparison of tests results generated by the first and second electronic data processing methods according to the present invention.
Figure 18B:
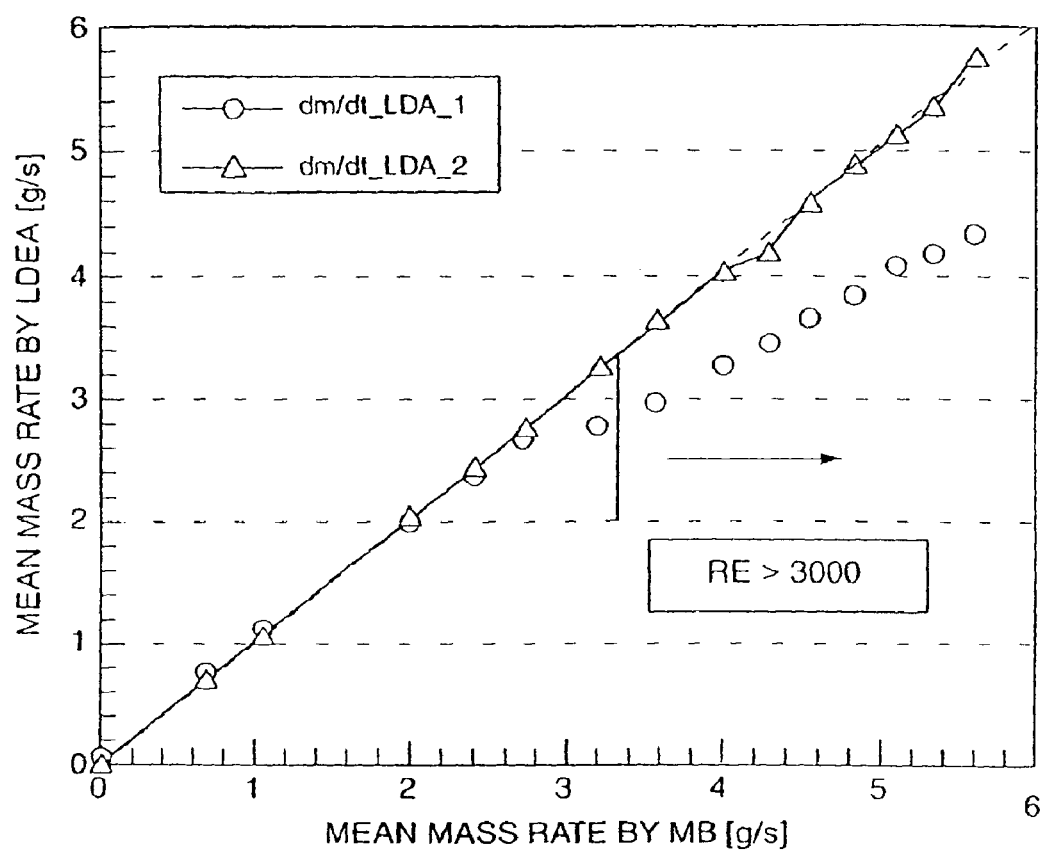

Referring to FIGS. 18A and 18B, it will be seen that the solution described for a periodically oscillating, turbulent flow in a pipeline of circular cross section with regard to FIGS. 17A and 17B provides more accurate results for high pressure diesel fuel injection systems than the solution for one-dimensional laminar flow described with respect to FIGS. 16A and 16B.

In order to test the relative merits of the two methods, a test was run using n-heptane having a density of 684 kg/m$^3$ and a kinematic viscosity of 6.1×10$^{-7}$ m$^2$/s. A high pressure injection system was run at pressures ranging from 0.5 to 7.0 MPa. Mass balance measurements were obtained within 60 s within a range of a few tenths of a gram to a few hundredths of a gram. The relationship between injection pressure and mean flow rate, measured by mass balance, is shown for injection periods of 0.5 ms, 1.0 ms, 2.0 ms, 4.0 ms, and open valve (steady flow) in FIG. 18A Results of the measurements by mass balance, the software method (LDA 1) of FIGS. 16A and 16B, and the software method (LDA 2) of FIGS. 17A and 17B are shown in FIG. 18B.

As shown in FIG. 18B, the laminar model LDA 1 has an accuracy, calculated by $$\delta = \frac{\dot{V}_{LDA}\rho - \dot{m}_{mass\ balance}}{\dot{m}_{mass\ balance}} \quad (31)$$

within ±2% when Re<2300 and flow rate is lower than 2 g/s. At increased injection pressures (or velocities, so that Re>3000)., the method is limited and has an accuracy decreased by −24% because the velocity field does not reflect the turbulent fluctuation and therefore gives a lower velocity field than is actually developed in the flow. On the other hand, the turbulent model (LDA 2.) demonstrates excellent correlation with mass balance measurement within a range of −1.4 to 2.0%. The turbulent model (LDA 2) is therefore preferred with the high injection pressures and velocities encountered in diesel fuel injection systems, and may be used with either diesel or gasoline fuel injection systems. The laminar model (LDA 1) may, however, be used with reasonably acceptable performance, particularly with gasoline fuel injection systems, for reasons of economy.

It is to be understood that the present invention is not limited to the embodiments described above, but encompasses any and all embodiments within the scope of the following claims. It will be noted, for example, that although the software methods are described using discrete Fourier transforms to calculate instantaneous flow rates, that a fast Fourier transform (FFT) technique may be used, such as the radix-2 technique in which the number of samples is an integral power of 2 and the samples are padded with zeroes, in order to take advantage of the increased calculation speeds resulting from symmetry, or other FFT techniques known in the digital signal processing art may be used.

What is claimed is:

1. A flow meter comprising:
   a measurement tube installed in a fuel supply conduit, wherein the fuel supply conduit supplies fuel to at least one fuel injector in a fuel injection system;
   a laser-Doppler anemometer generating a pair of laser beams intersecting in a control measurement volume in a center line of fuel flow through the measurement tube;
   a velocity calculating mechanism connected to the laser-Doppler anemometer for calculating a series of instantaneous center line velocities of fuel flow through the measurement tube; and
   a flow rate calculating mechanism connected to the velocity calculating mechanism for calculating a series of instantaneous volumetric flow rates in the measurement tube and for calculating a mass flow rate by integrating the series of instantaneous volumetric flow rates.

2. The flow meter of claim 1, wherein the flow meter is an on-board flow meter which is installed in a vehicle.

3. The flow meter of claim 2, wherein the vehicle includes an electronic engine control mechanism and at least one of: (a) the volumetric flow rates; and (b) the mass flow rate are supplied to the electronic engine control mechanism.

4. The flow meter of claim 3, wherein the electronic engine control mechanism uses at least one of: (a) the volumetric flow rates; and (b) the mass flow rate to adjust at least one fuel injection parameter associated with the fuel injection system.

5. The flow meter of claim 2, wherein the vehicle includes a fuel tank and the fuel supply conduit in which the measurement tube is installed carries fuel from the fuel tank.

6. The flow meter of claim 2, wherein the vehicle includes a fuel pump and the fuel supply conduit in which the measurement tube is installed carries fuel from the fuel pump.

7. The flow meter of claim 1, wherein the measurement tube is constructed at least in part from quartz glass.

8. The flow meter of claim 7, wherein the quartz glass is substantially transparent.

9. The flow meter of claim 8, wherein the quartz glass is in the form of an elongated tube.

10. The flow meter of claim 9, further comprising a protective sheathe around at least a portion of the quartz glass.

11. The flow meter of claim 10, wherein the protective sheathe is formed from steel.

12. The flow meter of claim 1, wherein the laser-Doppler anemometer comprises a laser light source and a photodetector.

13. The flow meter of claim 12, wherein the laser light source comprises a laser diode and the photodetector comprises a PIN diode.

14. The flow meter of claim 1, wherein the laser-Doppler anemometer comprises:
   (a) a laser diode;
   (b) a beam splitting mechanism for splitting a laser beam emitted by the laser diode into two laser beams focused to intersect in the control measurement volume in the center line of the measurement tube; and
   (c) a PIN diode for receiving light scattered by fuel flowing in the control measurement volume of the measurement tube.

15. The flow meter of claim 14, wherein each of the two laser beams is directed into the measurement tube at an angle which is substantially normal to the flow of fuel through the measurement tube.

16. The flow meter of claim 15, wherein: (a) the cross-section of the measurement tube is substantially circular; (b) the two laser beams are directed into the measurement tube at a first location on the cross-section; and (c) the PIN diode is disposed to receive light scattered by fuel flowing in the control measurement volume from a second location on the cross-section.

17. The flow meter of claim 16, wherein the second location on the cross-section is substantially 180 degrees from the first location on the cross-section in both a clockwise and counter-clockwise direction.

18. The flow meter of claim 16, wherein the second location on the cross-section is greater than 180 degrees from the first location on the cross-section in one of a clockwise and a counter-clockwise direction and the second location on the cross-section is less than 180 degrees from the first location on the cross-section in one of a clockwise and counterclockwise direction.

19. The flow meter of claim 14, further comprising a focusing mechanism for focusing scattered light from the control measurement volume on the PIN diode.

20. The flow meter of claim 1, wherein the flow rate calculating mechanism includes means for:
   (a) performing an inverse Fourier transform to calculate a series of harmonic coefficients $c_0, \ldots, c_n$ from the series of instantaneous center line velocities;
   (b) computing a series of pressure coefficients $p_0, \ldots, p_n$, from the harmonic coefficients $c_0, \ldots, c_n$ by solving the equations $$p_0 = \frac{2c_0 v}{R^2} \text{ and } p_n = \frac{c_n in\omega}{1 - \frac{1}{J_0(i^{3/2} Ta_n)}};$$

(c) computing a series of instantaneous volumetric flow rates from the pressure coefficients $P_0, \ldots, P_n$, by solving the equation $$V(t) = \frac{\pi R^2}{2} \left( \frac{R^2 p_0}{4v} + \sum_{n=1}^{\infty} \left\{ \frac{p_n}{n\omega} i e^{in\omega t} \left[ \frac{4i^{1/2} J_1(i^{3/2} Ta_n)}{Ta_n J_0(i^{3/2} Ta_n)} - 2 \right] + C.C. \right\} \right); \text{ and}$$

(d) computing a mass flow rate by integrating the volumetric flow rates using the fluid density and cross sectional area of the measurement tube.

21. The flow meter of claim 1, wherein the flow rate calculating mechanism includes means for:

(a) performing an inverse Fourier transform to calculate a first series of harmonic coefficients $c_0, \ldots, c_n$ and a second series of harmonic coefficients $c_0', \ldots, c_n'$ from the series of instantaneous center line velocities, where the summation in the first series is incremented when the Stokes layer thickness is greater than ten times the optic interference fringe from the intersection of the two laser beams and the summation in the second series is incremented when the Stokes layer thickness is not greater than ten times the optic interference fringe from the intersection of the two laser beams;

(b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_0 v}{R^2}$$

$$p_{nz} = \frac{c_n n\omega i}{\left[1 - \frac{1}{J_0(i^{3/2} Ta_n)}\right]}, \ n \in [1, N_\delta]$$

$$p_{nz}' + \sqrt{p_{nz}' p_{nr}'} = \frac{2c_n' n\omega i}{\left[1 - \frac{1}{J_0(i^{3/2} Ta_n)}\right]}, \ n \in [N_\delta + 1, N_{meas}]$$

(c) computing a series of instantaneous volumetric flow rates from the pressure coefficients $p_0, \ldots, p_n$ and $p_0', \ldots, p_n'$ by solving the equation $$\dot{V}(t) = 2\pi \int_0^R \left( \tilde{u} + \sqrt{\overline{u'v'}} \right) r \, dr = \frac{\pi R^2}{2} \left[ \frac{p_0 R^2}{4v} + \right.$$

$$\sum_{n=1}^{\infty} \left( \frac{p_{nz} - \left\{ \frac{p_{nz}'}{2} + \frac{\sqrt{p_{nz}' p_{nr}'}}{2} \right\}}{n\omega} i e^{in\omega t} \left\{ \frac{4i^{1/2} J_1(i^{3/2} Ta_n)}{Ta_n J_0(i^{3/2} Ta_n)} - 2 \right\} \right) +$$

$$\left. C.C. \right]; \text{ and}$$

(d) computing a mass flow rate by integrating the volumetric flow rates using the fluid density and cross sectional area of the measurement tube.

22. The flow meter of claim 1, wherein the flow rate calculating mechanism includes means for:

(a) performing an inverse Fourier transform on the series of instantaneous center line velocities to obtain a first series of harmonic coefficients $c_0, \ldots, c_n$, and a second series of harmonic coefficients $c_0', \ldots, c_n'$, where the summation in the first series is incremented when the Reynolds number is $\leq 3000$ and the summation in the second series is incremented when the Reynolds number is $> 3000$;

(b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_0 v}{R^2}$$

$$p_{nz} = \frac{c_n n\omega i}{\left[1 - \frac{1}{J_0(i^{3/2} Ta_n)}\right]}, \ n \in [1, N_\delta]$$

$$p_{nz}' + \sqrt{p_{nz}' p_{nr}'} = \frac{2c_n' n\omega i}{\left[1 - \frac{1}{J_0(i^{3/2} Ta_n)}\right]}, \ n \in [N_\delta + 1, N_{meas}]$$

; and (c) computing a series of instantaneous volumetric flow rates from the pressure coefficients $p_0, \ldots, p_n$, and $p_0', \ldots, p_n'$ by solving the equation $$\dot{V}(t) =$$

$$2\pi \int_0^R \left( \tilde{u} + \sqrt{\overline{u'v'}} \right) r \, dr = \frac{\pi R^2}{2} \left[ \frac{p_0 R^2}{4v} + \sum_{n=1}^{\infty} \left( \frac{p_{nz} - \left\{ \frac{p_{nz}'}{2} + \frac{\sqrt{p_{nz}' p_{nr}'}}{2} \right\}}{n\omega} \right. \right.$$

$$\left. \left. i e^{in\omega t} \left\{ \frac{4i^{1/2} J_1(i^{3/2} Ta_n)}{Ta_n J_0(i^{3/2} Ta_n)} - 2 \right\} \right) + C.C. \right].$$

23. The flow meter of claim 1, wherein at least one of the velocity calculating mechanism and the flow rate calculating mechanism includes software.

* * * * *